US008213042B2

(12) United States Patent
Minami et al.

(10) Patent No.: US 8,213,042 B2
(45) Date of Patent: Jul. 3, 2012

(54) IMAGE FORMING APPARATUS, IMAGE FORMING METHOD CARRIED OUT BY THE IMAGE FORMING APPARATUS, AND COMPUTER-READABLE RECORDING MEDIUM HAVING IMAGE FORMING PROGRAM RECORDED THEREON

(75) Inventors: Takeshi Minami, Amagasaki (JP);
Takeshi Morikawa, Takarazuka (JP);
Nobuo Kamei, Amagasaki (JP); Kei Shigehisa, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1221 days.

(21) Appl. No.: 11/946,529

(22) Filed: Nov. 28, 2007

(65) Prior Publication Data
US 2008/0309984 A1    Dec. 18, 2008

(30) Foreign Application Priority Data

Jun. 15, 2007   (JP) ................................. 2007-158674

(51) Int. Cl.
*G06F 15/00* (2006.01)
*G06F 17/00* (2006.01)
(52) U.S. Cl. ...................................... 358/1.18; 715/274
(58) Field of Classification Search .................. None
See application file for complete search history.

(56) References Cited

U.S. PATENT DOCUMENTS

| 2001/0039545 | A1 | 11/2001 | Nishizawa | |
|---|---|---|---|---|
| 2004/0046987 | A1 | 3/2004 | Mima | |
| 2007/0266057 | A1* | 11/2007 | Utsumi | 707/203 |
| 2007/0285712 | A1* | 12/2007 | Komada | 358/1.15 |

FOREIGN PATENT DOCUMENTS

| JP | 2001-306732 | | 11/2001 |
|---|---|---|---|
| JP | 2003-326777 | | 11/2003 |
| JP | 2004-046537 | A1 | 2/2004 |

OTHER PUBLICATIONS

Notice of Ground of Rejection in JP 2007-158674 dated May 12, 2009, and an English Translation thereof.

* cited by examiner

*Primary Examiner* — Saeid Ebrahimi Dehkordy
(74) *Attorney, Agent, or Firm* — Buchanan Ingersoll & Rooney PC

(57) ABSTRACT

In order to maintain consistency between stored data and an image formed on a recording medium, an MFP includes an HDD to store data, a data designation portion to designate target data to be an output target from the data stored in the HDD, a prohibition portion to prohibit modification or deletion of the target data, and an image forming portion to generate a composite image by combining the target data with positional information indicating a position in the HDD where the target data is stored and to form the composite image on a sheet of paper.

19 Claims, 18 Drawing Sheets

F I G. 2
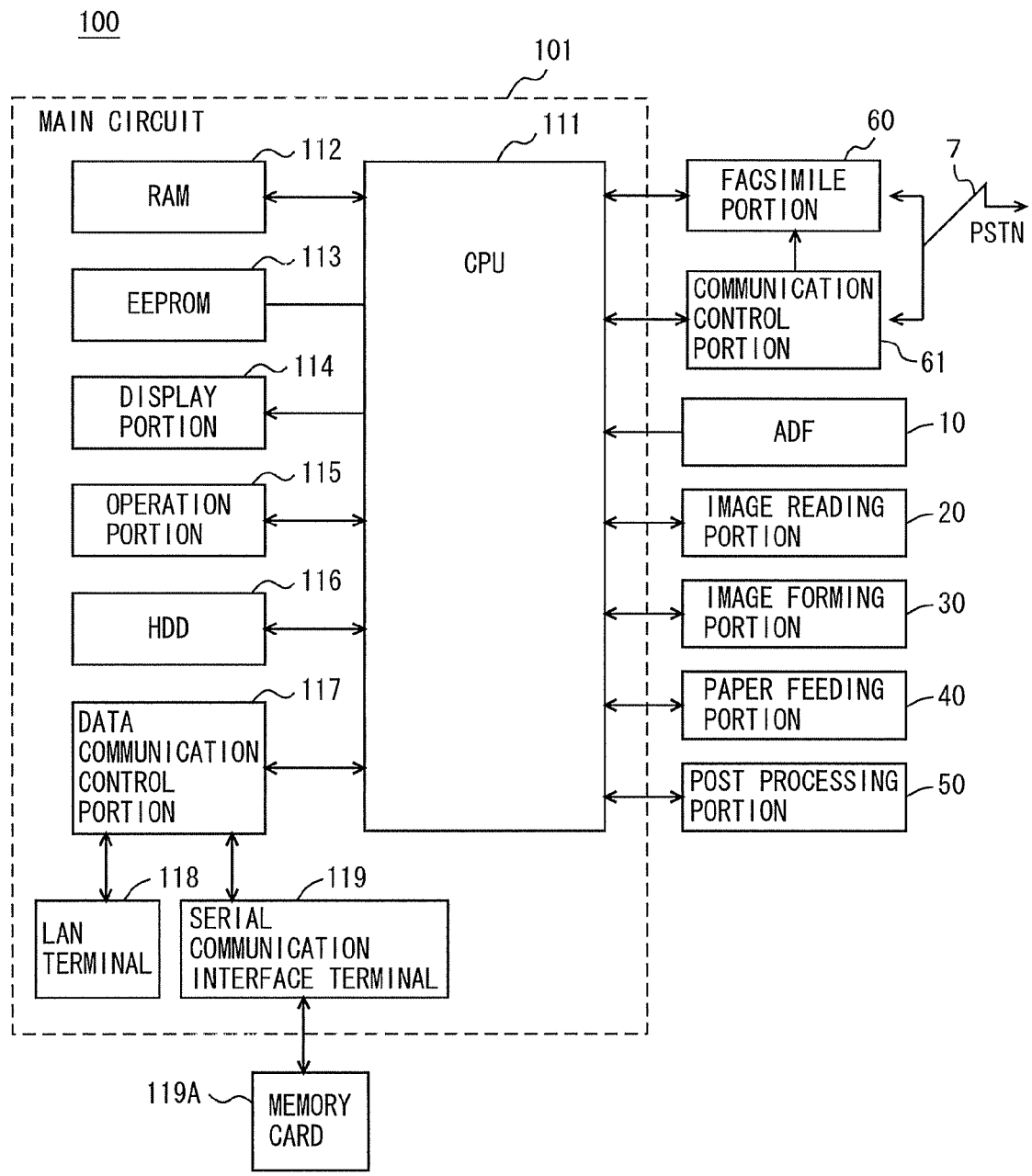

| FILE NAME | ATTRIBUTE INFORMATION ||
|---|---|---|
| | PROHIBITION PERIOD | USER ID |

| FILE NAME | ATTRIBUTE INFORMATION ||
|---|---|---|
| | SAVED DATE AND TIME | PROHIBITION PERIOD |

F I G. 1 0
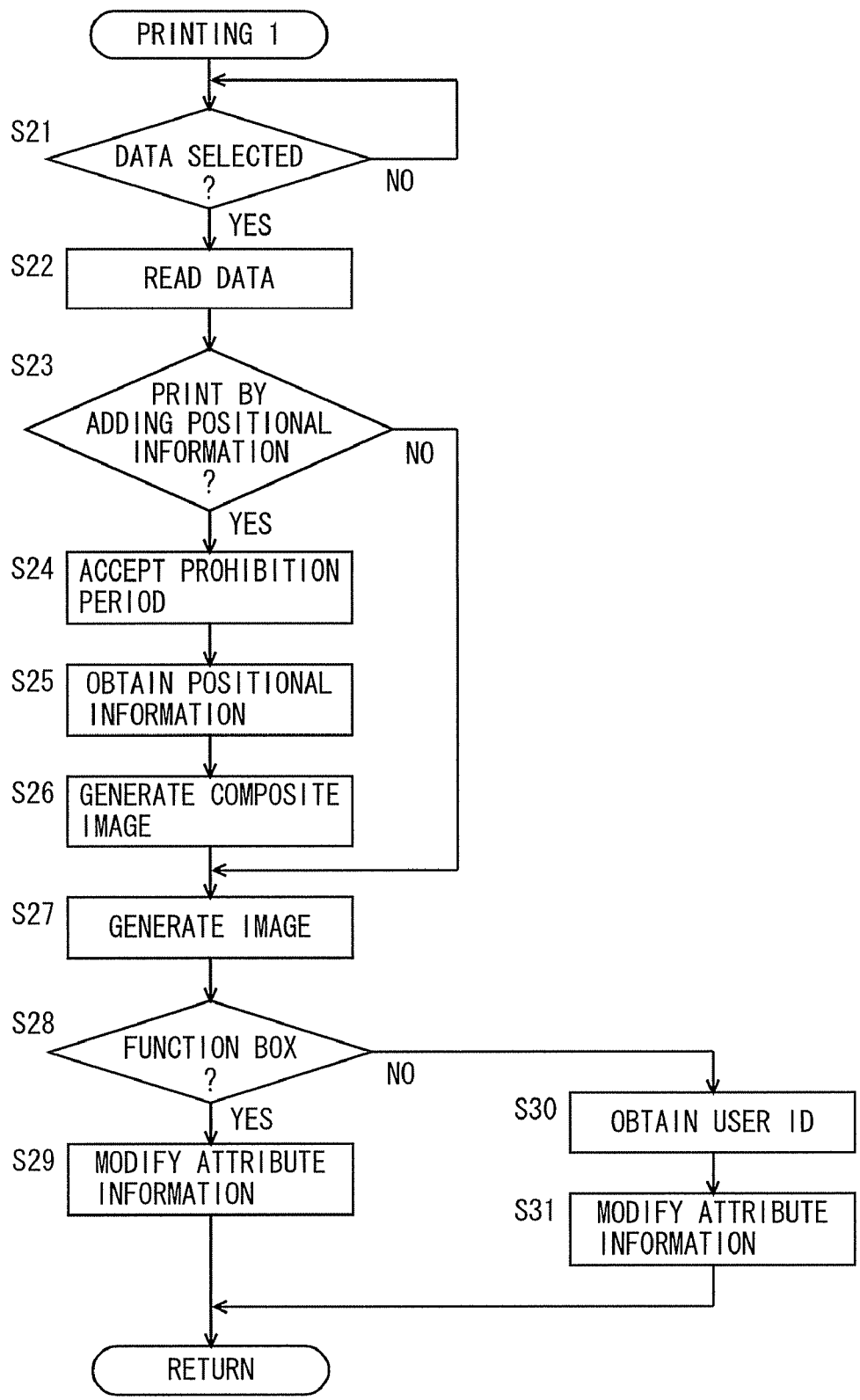

| ORIGINAL NAME | COPY NAME | ATTRIBUTE INFORMATION |||
|---|---|---|---|---|
| | | MODIFICATION HISTORY | PROHIBITION PERIOD | USER ID |

| ORIGINAL NAME | COPY NAME | ATTRIBUTE INFORMATION |||
|---|---|---|---|---|
| | | MODIFICATION HISTORY | SAVED DATE AND TIME | PROHIBITION PERIOD |

F I G. 2 2
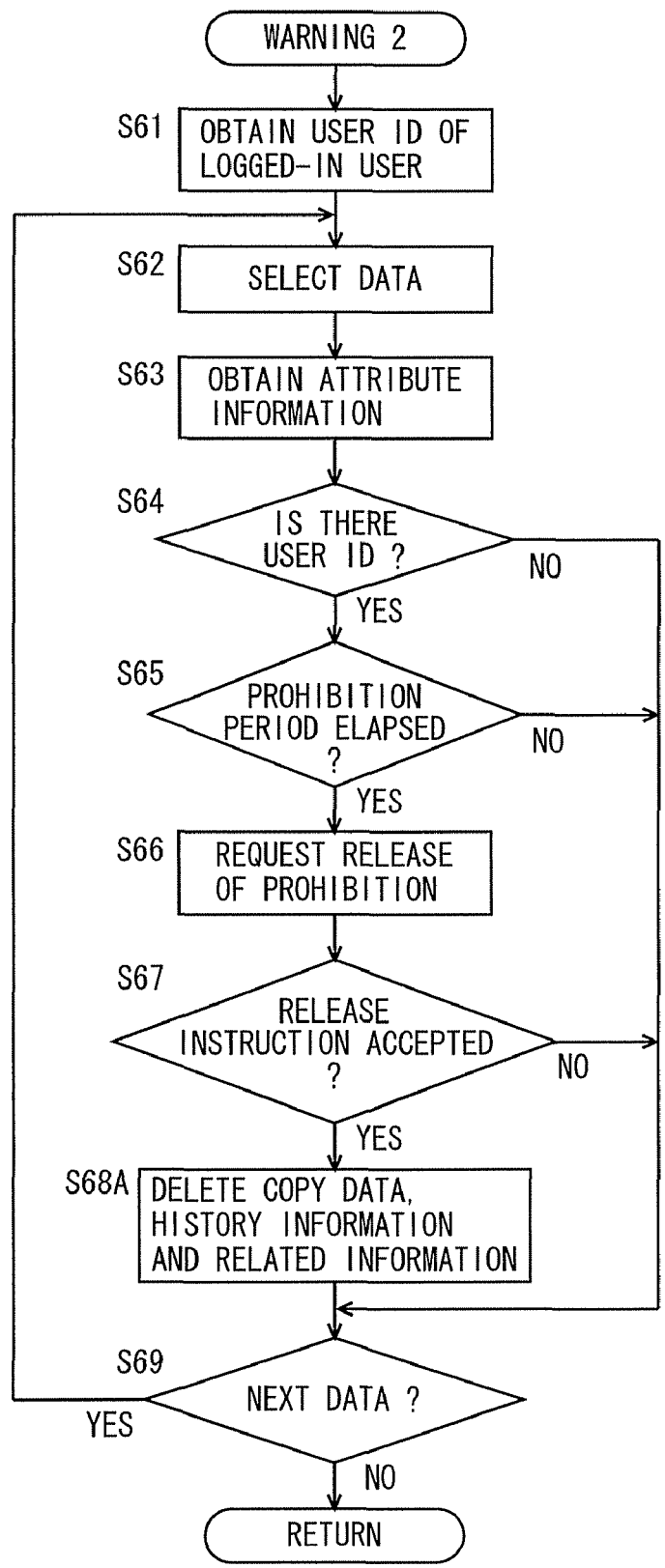

IMAGE FORMING APPARATUS, IMAGE FORMING METHOD CARRIED OUT BY THE IMAGE FORMING APPARATUS, AND COMPUTER-READABLE RECORDING MEDIUM HAVING IMAGE FORMING PROGRAM RECORDED THEREON

This application is based on Japanese Patent Application No. 2007-158674 filed with Japan Patent Office on Jun. 15, 2007, the entire content of which is hereby incorporated by reference.

BACKGROUND OF THE INVENTION

1. Field of the Invention

The present invention relates to an image forming apparatus, an image forming method and an image forming program, and more particularly to an image forming apparatus that forms an image using image data together with information of the position where the data is stored, an image forming method carried out by the image forming apparatus, and an image forming program.

2. Description of the Related Art

In recent years, a complex machine called an MFP (Multi Function Peripheral) provided with the functions as a scanner, printer, copier, and facsimile machine has become widespread. The MFP has a hard disk drive (HDD) as a mass storage, and is capable of storing a large amount of data. Japanese Patent Laid-Open No. 2004-046537 (Patent Document 1) discloses a technology to form an image of data stored in the MFP by adding thereto data of positional information indicating the position where the data is stored and, if the original image obtained by reading the original afterwards includes the positional information, to print an image of the data stored in the position indicated by the positional information.

The data stored in a storage such as the HDD, however, may be modified or deleted after formation of the image. If the data is modified or deleted after the image of the data is formed on a sheet of paper, there may be disagreement between the image formed on the sheet of paper and the data stored in the HDD.

SUMMARY OF THE INVENTION

The present invention has been accomplished in view of the foregoing problems, and an object of the present invention is to provide an image forming apparatus capable of maintaining consistency between stored data and an image formed on a recording medium.

Another object of the present invention is to provide an image forming method and an image forming program capable of maintaining consistency between stored data and an image formed on a recording medium.

In order to achieve the above objects, according to an aspect of the present invention, there is provided an image forming apparatus which includes: a storage portion to store data; a designation portion to designate target data to be an output target from among the data stored in the storage portion; a prohibition portion to prohibit modification or deletion of the target data; a combining portion to generate a composite image by combining the target data with positional information indicating a position in the storage portion where the target data is stored; and an image forming portion to form the composite image on a recording medium.

According to another aspect of the present invention, there is provided an image forming apparatus which includes: a storage portion to store data; a designation portion to designate original data to be an output target from among the data stored in the storage portion; a data-associating portion to store copy data duplicated from the original data in the storage portion and associate the original data with the copy data; a combining portion to generate a composite image by combining the copy data with positional information indicating a position in the storage portion where the copy data is stored; and an image forming portion to form the composite image on a recording medium.

According to a further aspect of the present invention, there is provided an image forming method which includes the steps of: storing data; designating target data to be an output target from among the stored data; prohibiting modification or deletion of the target data; generating a composite image by combining the target data with positional information indicating a position where the target data is stored; and forming the composite image on a recording medium.

According to yet another aspect of the present invention, there is provided an image forming method which includes the steps of: storing data; designating original data to be an output target from among the stored data; storing copy data duplicated from the original data and associating the original data with the copy data; generating a composite image by combining the copy data with positional information indicating a position where the copy data is stored; and forming the composite image on a recording medium.

According to a further aspect of the present invention, there is provided a computer-readable recording medium having recorded thereon an image forming program which causes a computer to execute processing including the steps of: storing data; designating target data to be an output target from among the stored data; prohibiting modification or deletion of the target data; generating a composite image by combining the target data with positional information indicating a position where the target data is stored; and forming the composite image on a recording medium.

According to a still further aspect of the present invention, there is provided a computer-readable recording medium having recorded thereon an image forming program which causes a computer to execute processing including the steps of: storing data; designating original data to be an output target from among the stored data; storing copy data duplicated from the original data and associating the original data with the copy data; generating a composite image by combining the copy data with positional information indicating a position where the copy data is stored; and forming the composite image on a recording medium.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing an example of the hardware configuration of the MFP.

FIG. 10 is a flowchart illustrating an example of the flow of printing processing.

FIG. 22 is a second flowchart illustrating an example of the flow of the warning processing.

DESCRIPTION OF THE PREFERRED EMBODIMENTS

Figure 1:
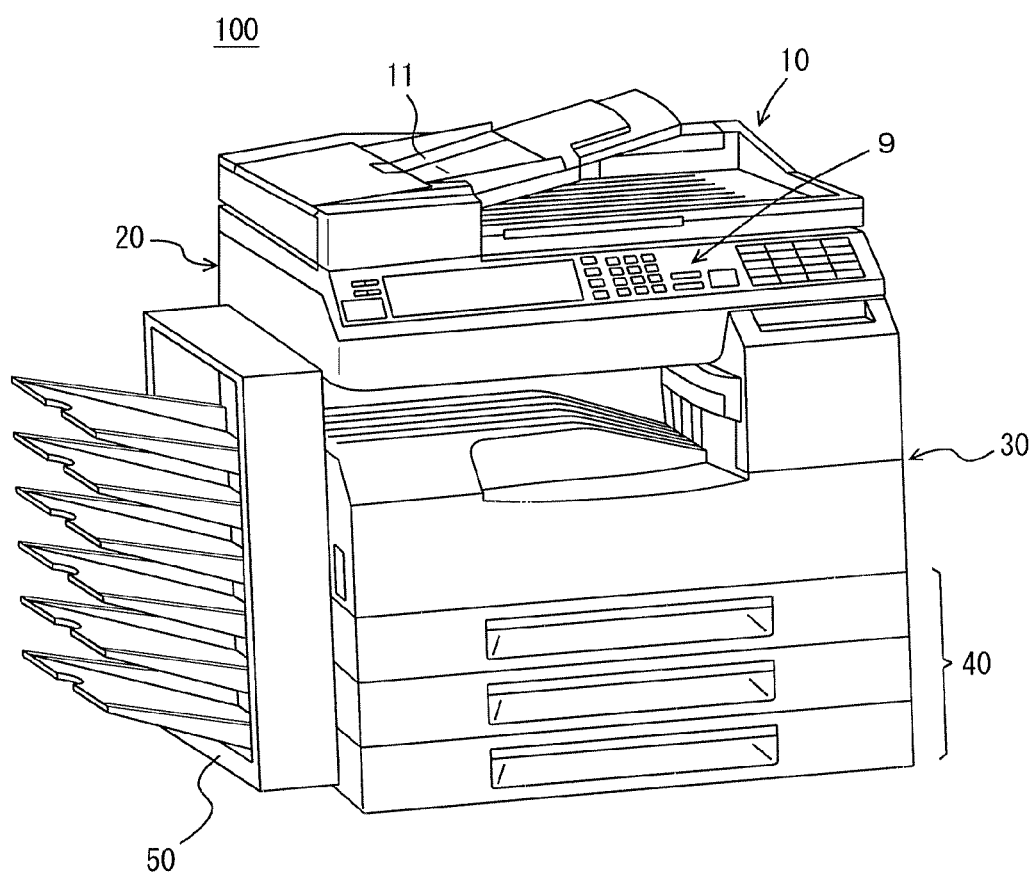
FIG. 1 is a perspective view of an MFP according to a first embodiment of the present invention.

Embodiments of the present invention will now be described with reference to the drawings. In the following description, like reference characters denote like parts, which have like names and functions, and therefore, detailed description thereof will not be repeated.

First Embodiment

FIG. 1 is a perspective view of an MFP in a first embodiment of the present invention. Referring to FIG. 1, the MFP 100 as an image forming apparatus includes an automatic document feeder (ADF) 10, an image reading portion 20, an image forming portion 30, a paper feeding portion 40, and a post processing portion 50. ADF 10 delivers a plurality of originals mounted on an original platform one by one to image reading portion 20. In response, image reading portion 20 reads image information of photograph, character, picture and the like from the original in an optical manner to acquire image data.

Image forming portion 30, in receipt of the image data, forms an image on a sheet of paper based on the image data. Image forming portion 30 forms an image in color using toners of three colors of cyan, magenta, and yellow. Alternatively, it forms an image in monochrome using any of the toners of cyan, magenta, yellow and black.

Paper feeding portion 40 stores sheets of paper, and supplies them one by one to image forming portion 30. Post processing portion 50 discharges the sheet having the image formed thereon. Post processing portion 50 has a plurality of discharge trays to allow sorting of the recording sheets for discharge. Further, post printing portion 50 has a hole-punching portion and a stapler portion to enable hole-punching or stapling of the discharged recording sheets. MFP 100 has an operation panel 9 provided on a top surface thereof.

FIG. 2 is a block diagram showing an example of the hardware configuration of the MFP. Referring to FIG. 2, MFP 100 further includes a main circuit 101, a facsimile portion 60 and a communication control portion 61. Main circuit 101 is connected to facsimile portion 60, communication control portion 61, ADF 10, image reading portion 20, image forming portion 30, paper feeding portion 40, and post processing portion 50. Main circuit 101 includes a central processing unit (CPU) 111, a RAM (Random Access Memory) 112 used as a working area for CPU 111, an EEPROM (Electronically Erasable Programmable Read Only Memory) 113 for storing a program executed by CPU 111 and the like, a display portion 114, an operation portion 115, a hard disk drive (HDD) 116 as a mass storage, and a data communication control portion 117. CPU 111 is connected with display portion 114, operation portion 115, HDD 116, and data communication control portion 117, and is responsible for overall control of main circuit 101. CPU 111 is also connected with facsimile portion 60, communication control portion 61, ADF 10, image reading portion 20, image forming portion 30, paper feeding portion 40, and post processing portion 50, and is responsible for overall control of MFP 100.

Display portion 114 is a display such as a liquid crystal display (LCD), an organic electro-luminescence display (ELD) or the like, and displays an instruction menu for the user, information about acquired image data, and others. Operation portion 115 is provided with a plurality of keys, and accepts input of data such as instructions, characters and numerical characters, according to the key operations of the user. Operation portion 115 includes a touch panel provided on display portion 114. Display portion 114 and operation portion 115 constitute operation panel 9.

HDD 116 includes a plurality of storage areas. Herein, the plurality of storage areas are called BOXes. The BOXes include a common BOX and a function BOX. The common BOX is a storage area assigned to at least two of a plurality of users registered as the users of MFP 100. The function BOX is associated with a processing content, and processing is performed on the data stored in the function BOX in accordance with the processing content associated therewith. For example, when the processing of deleting stored data after a lapse of a prescribed period from storage thereof is defined as the processing content, the data stored in the function BOX is deleted from the function BOX when the prescribed period has passed since the data was stored therein.

Data communication control portion 117 includes a LAN terminal 118 that is an interface for communication according to a communication protocol such as TCP (Transmission Control Protocol) or FTP (File Transfer Protocol), and a serial communication interface terminal 119 for serial communication. Data communication control portion 117 transmits and receives data to and from an external apparatus connected to LAN terminal 118 or serial communication interface terminal 119, in accordance with an instruction from CPU 111.

When a LAN cable for connecting to a network is connected to LAN terminal 118, data communication control portion 117 can communicate with another MFP or a computer via lAN terminal 118.

CPU 111 controls data communication control portion 117 to read a program to be executed by CPU 111 from a memory card 119A, and stores the read program in RAM 112 for execution. It is noted that the recording medium for storing the program to be executed by CPU 111 is not restricted to memory card 119A. It may be a flexible disk, a cassette tape, an optical disc (CD-ROM (Compact Disc-ROM), MO (Magnetic Optical Disc), MD (Mini Disc), DVD (Digital Versatile Disc)), an IC card, an optical card, or a semiconductor memory such as a masked ROM, an EPROM (Erasable Programmable ROM), an EEPROM (Electronically EPROM), or the like. Alternatively, CPU 111 may download the program from a computer connected to the Internet and store the same in HDD 116, or a computer connected to the Internet may write the program to HDD 116, and thereafter, the program stored in HDD 116 may be loaded to RAM 112 for execution by CPU 111. As used herein, the "program" includes, not only the program directly executable by CPU 111, but also a source program, a compressed program, an encrypted program, and others.

Communication control portion 61 is a modem for connecting CPU 111 to public switched telephone networks (PSTN) 7. MFP 100 is assigned a telephone number in PSTN 7 in advance. When there is a call from a facsimile machine connected to PSTN 7 to the telephone number assigned to MFP 100, communication control portion 61 detects the call. Upon detection of the call, communication control portion 61 establishes the call to enable communication of facsimile portion 60.

Facsimile portion 60 is connected to PSTN 7, and transmits facsimile data to or receives facsimile data from PSTN 7. Facsimile portion 60 converts the received facsimile data to print data that can be printed by image forming portion 30, and outputs the same to image forming portion 30. In response, image forming portion 30 prints the facsimile data received by facsimile portion 60 onto a sheet of recording paper. Further, facsimile portion 60 converts the data stored in HDD 116 to facsimile data, and outputs the same to a facsimile machine or another MFP connected to PSTN 7. In this manner, it is possible to output the data stored in HDD 116 to the facsimile machine or the other MFP. As such, MFP 100 has the facsimile transmitting/receiving function.

Figure 3:
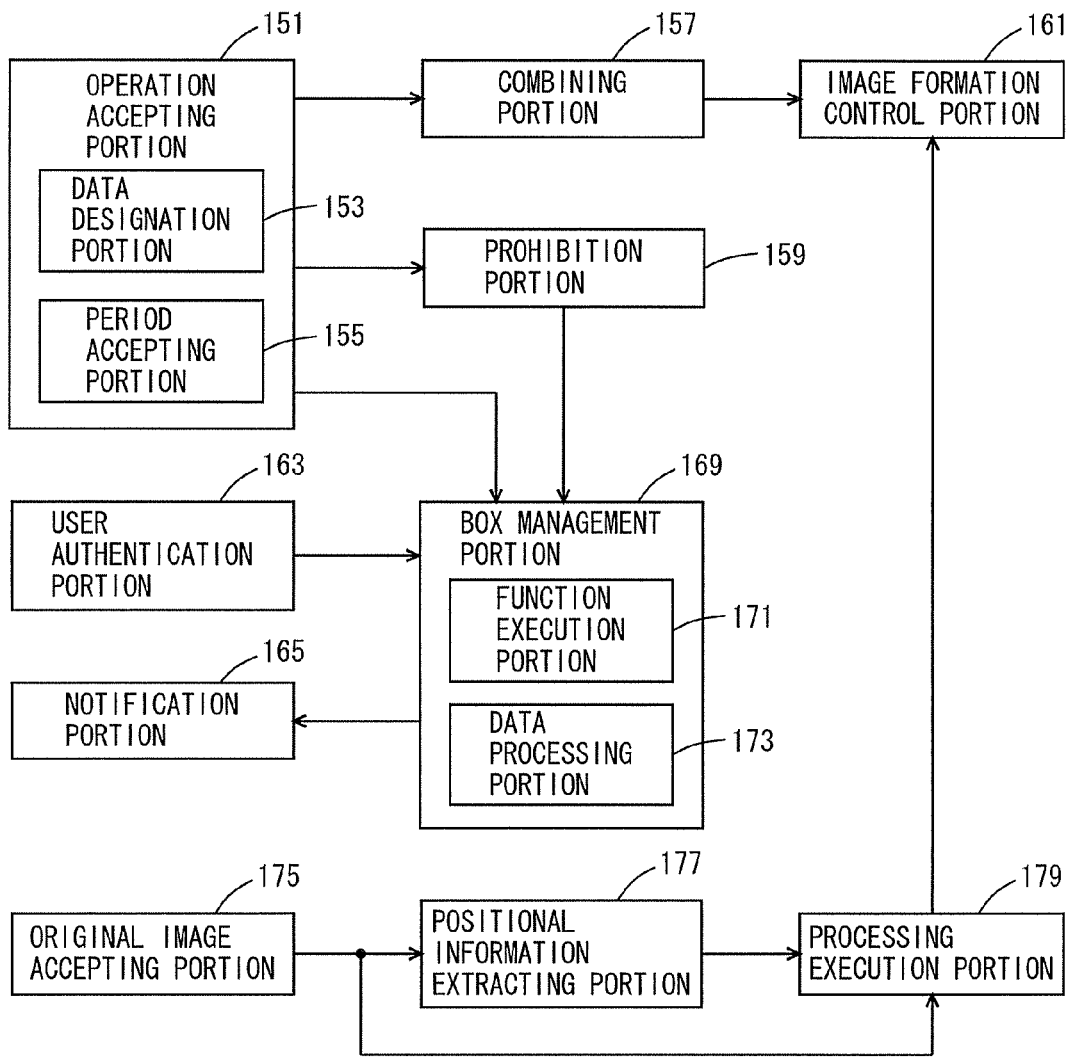
FIG. 3 is a functional block diagram showing an overview of the function of a CPU provided in the MFP.

FIG. 3 is a functional block diagram showing an overview of the function of a CPU provided in the MFP. Referring to FIG. 3, CPU 111 includes: an operation accepting portion 151 for accepting an operation input by the user to operation portion 115; a combining portion 157 to generate a composite image by combining data as an output target and information of a position where the data is stored; a prohibition portion 159 to prohibit modification or deletion of target data that is a target of an output instruction; an image formation control portion 161 for controlling image forming portion 30; a user authentication portion 163 for authenticating a user (operator) operating MFP 100; a notification portion 165 for notifying the operator; a BOX management portion 169 for managing the BOXes in HDD 116; an original image accepting portion 175 to accept an original image from image reading portion 20 that reads and outputs an original; a positional information extracting portion 177 for extracting positional information from the original image; and a processing execution portion 179 for processing data stored in the position specified by the positional information.

Operation accepting portion 151 accepts an instruction that the user inputs to operation portion 115. When operation accepting portion 151 accepts an operation on the data stored in HDD 116, it outputs the accepted operation to BOX management portion 169. The operation on the data stored in HDD 116 includes deletion or modification of the data. The user can delete or modify the data stored in HDD 116 by inputting the deletion or modification operation to operation portion 115. The operation may include the case where an application program executed by a computer connected to MFP 100 modifies or deletes the data stored in HDD 116. Further, the modification may include overwriting of the data with modified data.

Operation accepting portion 151 includes a data designation portion 153 and a period accepting portion 155. When the user instructs execution of BOX print processing to print the data stored in HDD 116, data designation portion 153 accepts designation of target data. That is, data designation portion 153 accepts designation of the target data from among the data stored in HDD 116 that is to be a target of the BOX print processing. More specifically, it displays a BOX print designation screen on display portion 114, and accepts designation of any of the file names displayed on the BOX print designation screen. Data designation portion 153 sets the data of the designated file name as the target data, and outputs the file name of the target data to combining portion 157 and prohibition portion 159.

When the user instructs execution of the BOX print processing, period accepting portion 155 accepts a period during which modification or deletion of the data is prohibited. More specifically, when a certain period is input from operation portion 115 by the user to an area for inputting the period provided in the BOX print designation screen displayed on display portion 114, period accepting portion 155 accepts the period from operation portion 115. Period accepting portion 155 then outputs the accepted period to prohibition portion 159. While the case of accepting the period is shown, it is also possible to accept the last date and time until when modification or deletion of the target data is prohibited.

Figure 4:
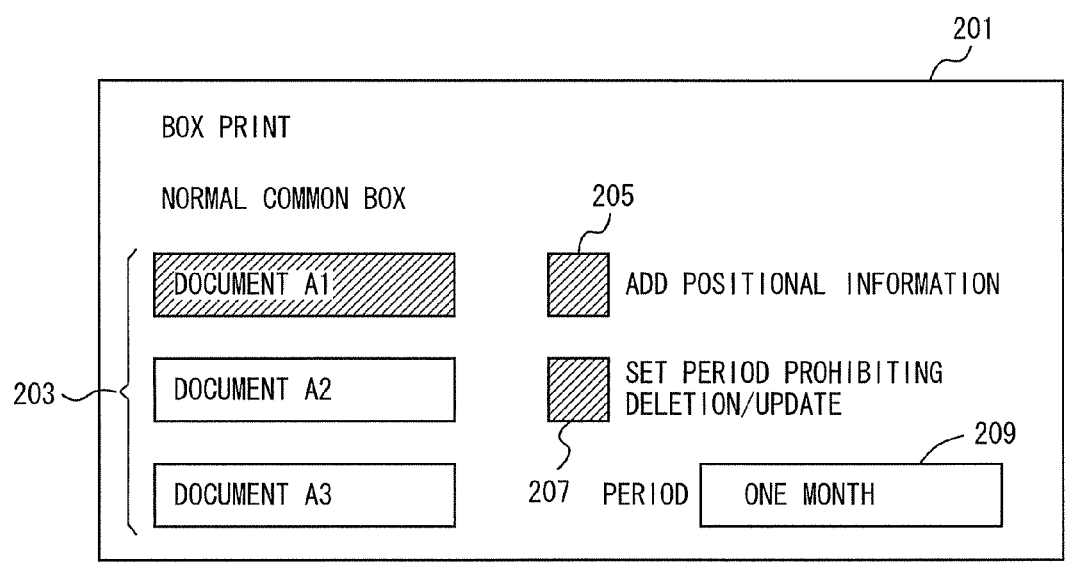
FIG. 4 shows an example of a BOX print designation screen.

FIG. 4 shows an example of the BOX print designation screen. The BOX print designation screen 201 includes a file list display area 203 where file names of the data stored in the BOX are displayed, an area 205 for designating addition of the positional information, an area 207 for designating as to whether to set a period prohibiting modification or deletion of data, and an area 209 for inputting the period. Shown in the figure is the case where "document A1" is selected from the file names displayed in file list display area 203. Further, in this case, area 205 and area 207 are both checked to designate addition of the positional information and setting of the period, and "one month" is set as the period.

Returning to FIG. 3, when a file name is input from data designation portion 153, combining portion 157 reads the target data specified by the file name from HDD 116 and generates an image of the target data, and also generates a composite image having the image of the target data combined with the positional information indicating the position in HDD 116 where the target data is stored.

The positional information includes, besides the file name, a name of the storage area (BOX) where the target data is stored, and in the case where the storage area further has a plurality of sub storage areas, a name of the sub storage area where the target data is stored. It may also include apparatus identification information for identification of MFP 100. For the positional information, a URL (Uniform Resource Locator) may be used. When the URL is used, even in the case where an original image formed in another MFP is read, it is possible to specify original data of the original image, to obtain the original data from the other MFP. Combining portion 157 outputs the generated composite image to image formation control portion 161. Image formation control portion 161 causes image forming portion 30 to form the composite image on a recording medium such as a sheet of paper.

To combine the image of the target data and the positional information, the positional information may be superimposed on the image of the target data as electronic watermark information. Alternatively, a bar code or a two-dimensional code of the positional information, or an image of the characters of the positional information may be combined with the image of the target data.

Figure 5:
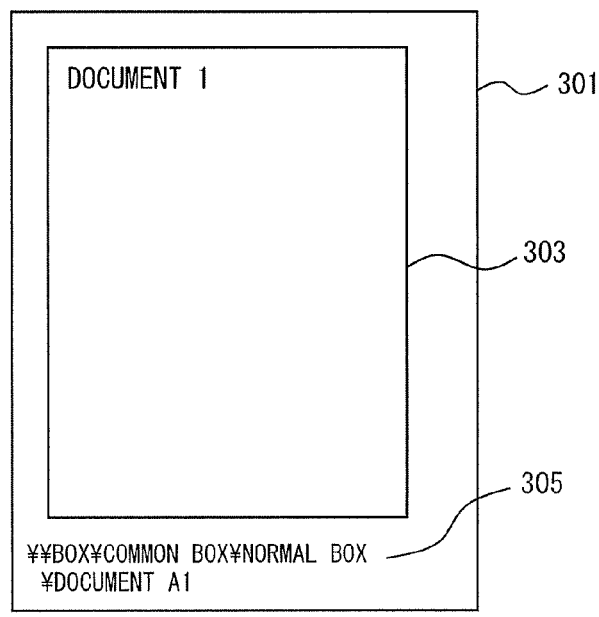
FIG. 5 shows an example of a composite image.

FIG. 5 shows an example of the composite image. The image shown is generated by combining the image of the characters of the positional information with the image of the target data. Referring to FIG. 5, the composite image 301 has an image 305 of the characters of the positional information arranged below the image 303 of the target data.

Returning to FIG. 3, prohibition portion 159 receives the file name input from data designation portion 153 and the period input from period accepting portion 155. Prohibition portion 159 prohibits modification or deletion of the target data associated with the file name during the period input from period accepting portion 155. More specifically, it outputs the file name and the prohibition period to BOX management portion 169 so as to assign the prohibition period to the attribute information of the target data associated with the file name.

User authentication portion 163 authenticates the user operating MFP 100. MFP 100 stores a user table including sets of user IDs and passwords assigned in advance to respective users, to restrict the users operating MFP 100. User authentication portion 163 displays a login screen on display portion 114 to accept a user ID and password the user inputs to operation portion 115 in accordance with the login screen. If the user table includes the set of user ID and password identical to the accepted set of user ID and password, it authenticates the user. While the case of using the user ID and password for user authentication is explained, it may also be possible to authenticate the user using biometric information such as fingerprint, iris, vein pattern or the like.

The user authenticated by user authentication portion 163 is hereinafter called a logged-in user. When authentication is successful, user authentication portion 163 outputs the user ID to BOX management portion 169. It may also be possible to permit login of a guest user to allow a user other than the pre-registered users to operate MFP 100. In such a case, user authentication portion 163 outputs a user ID assigned to the guest user to BOX management portion 169.

When the user ID is input from user authentication portion 163, BOX management portion 169 handles the operation input subsequently from operation accepting portion 151 as the operation input by the user assigned the previously input user ID. When the file name and the prohibition period are input from prohibition portion 159, BOX management portion 169 generates related information corresponding to the target data of the file name, and stores the same in HDD 116 in association with the target data.

Figures 6, 7, 8:
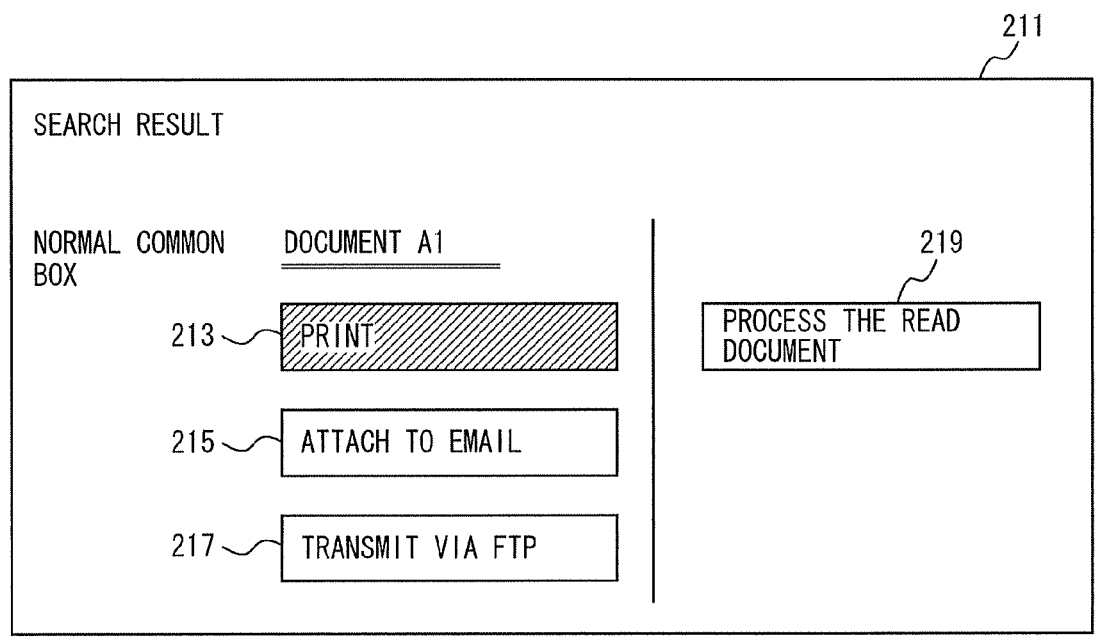
FIG. 6 is a first diagram showing an example of related information.
FIG. 7 is a second diagram showing another example of the related information.
FIG. 8 is a first diagram showing an example of an operation screen.

FIG. 6 is a first diagram showing an example of the related information. Shown in FIG. 6 is the related information associated with the target data stored in a common BOX. Referring to FIG. 6, the related information includes a file name of the target data and attribute information, and associates the target data with the attribute information. The attribute information includes a prohibition period and a user ID. The prohibition period is provided by prohibition portion 159. The user ID is of the logged-in user at the time point when the prohibition period was provided by prohibition portion 159. That is, the related information, including the user ID of the user who input an instruction to execute the BOX print processing described above (hereinafter, referred to as the "BOX print instruction"), the prohibition period designated by the user and the file name of the target data, is generated at the time point when the BOX print instruction is input.

Returning to FIG. 3, BOX management portion 169 may store related information of the target data in advance. In such a case, a file name of the target data is set as the file name in the related information, while nothing is set for the attribute information. For the related information already stored, BOX management portion 169 sets the prohibition period input from prohibition portion 159 as the prohibition period in the attribute information, and the user ID authenticated by user authentication portion 163 as the user ID in the attribute information. That is, the user ID of the user who input the BOX print instruction and the prohibition period designated by the user are set as the attribute information in the related information at the time point of input of the BOX print instruction, and the relevant attribute information is associated with the target data.

FIG. 7 is a second diagram showing an example of the related information. Shown in FIG. 7 is the related information associated with the target data stored in a function BOX. Referring to FIG. 7, the related information includes a file name of the target data and attribute information, and associates the target data with the attribute information. The attribute information includes a saved date and time, and a prohibition period. The prohibition period is supplied from prohibition portion 159. The saved date and time indicates the date and time when the target data was stored in the function BOX. The prohibition period is set in the attribute information at the time point when the user input the BOX print instruction.

Returning to FIG. 3, BOX management portion 169 may store related information of the target data in advance. In such a case, the file name of the target data is set for the file name in the related information, and nothing is set for the attribute information. For the related information already stored, BOX management portion 169 sets the prohibition period input from prohibition portion 159 as the prohibition period in the attribute information, and sets the date and time when the target data was stored in the function BOX as the saved date and time. That is, the attribute information is generated at the time point when the user input the BOX print instruction, and the attribute information is associated with the target data.

BOX management portion 169 includes a function execution portion 171 to execute a processing content associated with the function BOX, and a data processing portion 173 to execute processing in accordance with the operation input from operation accepting portion 151. Here, it is assumed that, as the processing content associated with the function BOX, the processing of deleting stored data after one week from storage thereof is defined. When data is stored in the function BOX, function execution portion 171 deletes the data from the function BOX after a lapse of one week from the time when the data was stored therein. Thus restricting the period for storing the data in the function BOX can prevent the data from being consistently stored in the function BOX, so that it is possible to effectively use the storage resource. However, in the case where the attribute information associated with the data stored in the function BOX by the related information includes a prohibition period for prohibiting modification or deletion of the data, function execution portion 171 does not delete the data if the prohibition period has not yet elapsed. As such, even if the data is stored in the function BOX, deletion of the data by function execution portion 171 is prohibited until the prohibition period passes.

When accepting an operation on the data stored in HDD 116 from operation accepting portion 151, data processing portion 173 processes the data according to the accepted operation. However, before processing the data, data processing portion 173 refers to the attribute information associated by the related information with the target data as the processing target, and if the attribute information includes the prohibition period, it refrains from executing the processing of modifying or deleting the data.

At the time point when user authentication portion 163 succeeds in user authentication, notification portion 165 notifies the logged-in user of presence of a target file to which the logged-in user issued a BOX print instruction in the past and modification or deletion of the data was prohibited at that time. More specifically, it determines whether there is any related information including the user ID of the logged-in user, and if the related information exists and the prohibition period included in the related information has elapsed, it notifies the logged-in user of presence of the target file for which modification or deletion was prohibited. For such notification, the file name included in the related information may be displayed on display portion 114, or a sound may be output.

Original image accepting portion 175 accepts an original image that image reading portion 20 outputs by reading an original. Original image accepting portion 175 outputs the accepted original image to positional information extracting portion 177 and processing execution portion 179. Positional information extracting portion 177 extracts positional information from the original image, and outputs the extracted positional information to processing execution portion 179.

Processing execution portion 179 receives an original image input from original image accepting portion 175 and positional information input from positional information extracting portion 177. Processing execution portion 179 processes either one of the original image and the target data stored in the position specified by the positional information. Processing execution portion 179 displays an operation screen on display portion 114, and determines which to process, the original image or the target data, based on the instruction input by the user. When the user selects the original image, it processes the original image. If the user does not select the original image, it processes the target data. When processing the target data, processing execution portion 179 reads the target data stored in the position specified by the positional information, and processes the read target data. The content of the processing is determined according to the instruction input by the user to operation portion 115 in accordance with the operation screen.

FIG. 8 is a first diagram showing an example of the operation screen. Referring to FIG. 8, the operation screen includes an area for displaying the file name "document A1" included in the positional information, and also has buttons 213, 215 and 217 for selecting the processing content, and a button 219 for selecting an original image. When button 219 is designated, the original image is selected as the processing target. If button 219 is not designated, the target data stored in the position specified by the positional information is selected as the processing target.

When button 213 is selected, printing for forming an image of the data is selected as the processing content. When button 215 is selected, email transmission for transmitting the data via email is selected as the processing content. When button 217 is selected, FTP (File Transfer Protocol) transmission for transmitting the data via FTP is selected as the processing content.

Figure 9:
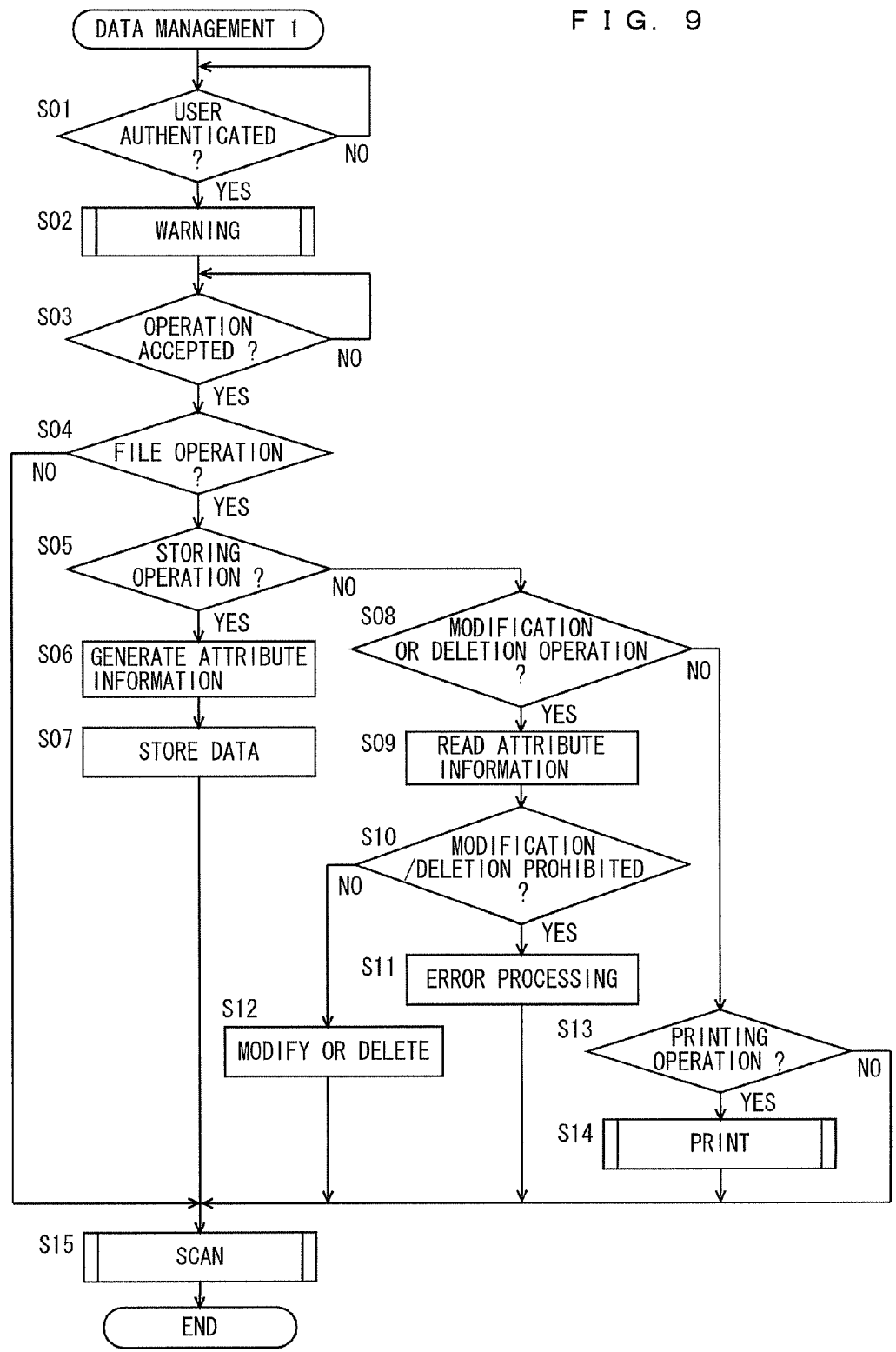
FIG. 9 is a first flowchart illustrating an example of the flow of data management processing.

FIG. 9 is a first flowchart illustrating an example of the flow of data management processing. The data management processing is carried out by CPU 111 when CPU 111 executes an image forming program. Referring to FIG. 9, CPU 111 determines whether user authentication has succeeded (step S01). CPU 111 is in a standby mode until the user authentication succeeds, and when the user authentication succeeds, the process proceeds to step S02. A user ID and password are accepted, and if the set of the user ID and password the same as the set of the accepted user ID and password is stored in the user table, it is determined that the user authentication succeeded. When the user authentication succeeded, the user ID authenticated is temporarily stored.

In step S02, warning processing is carried out. The warning processing, which will be described later, is the processing of requesting the user to release the prohibition on modification or deletion of the target data. This is for the purpose of preventing the undesirable event that modification or deletion of the target data is prohibited consistently and unnecessary data is maintained in HDD 116 for a long time.

In step S03, it is determined whether an operation has been accepted. Specifically, it is determined whether an operation has been input to operation portion 115. CPU 111 is in a standby mode until an operation is accepted, and once an operation is accepted, the process proceeds to step S04. In step S04, it is determined whether the accepted operation corresponds to a file operation having the data stored in HDD 116 as the processing target. If so, the process proceeds to step S05; otherwise, the process proceeds to step S15.

In step S05, it is determined whether the file operation corresponds to a storing operation to store data in HDD 116. If so, the process proceeds to step S06; otherwise, the process proceeds to step S08. The storing operation includes the operation related to the data reception processing of receiving data from an external apparatus such as another MFP or a computer, or the operation related to the facsimile reception processing of receiving facsimile data from a facsimile machine. In step S06, attribute information of the externally received data is generated. The received data is stored in HDD 116 in association with the attribute information (step S07), and the process proceeds to step S15. Here, the data and the related information including the attribute information are stored in HDD 116.

In step S08, it is determined whether the file operation corresponds to an operation of modifying or deleting the data stored in HDD 116. If so, the process proceeds to step S09; otherwise, the process proceeds to step S13. In step S09, the attribute information of the data to be a target of the modifying or deleting operation is read. Then, it is determined, based on the read attribute information, whether the modification or deletion is prohibited (step S10). If the attribute information includes the prohibition period and the prohibition period has not yet elapsed, it is determined that the modification or deletion is prohibited. Otherwise, it is determined that the modification or deletion is not prohibited. If the modification or deletion is prohibited, the process proceeds to step S11; otherwise, the process proceeds to step S12.

In step S11, error processing is carried out, and the process proceeds to step S15. For example, a message indicating that modification or deletion is prohibited is displayed on display portion 114. On the other hand, in step S12, the data stored in HDD 116 is modified or deleted according to the file operation, and the process proceeds to step S15. The data is modified or deleted only in the case where modification or deletion of the data is not prohibited.

In step S13, it is determined whether the file operation corresponds to a printing operation to form an image of the data. If it is the printing operation, the process proceeds to step S14. Otherwise, the process proceeds to step S51. The printing processing will be described later.

In step S15, scanning processing is carried out, and the process is terminated. The scanning processing will be described later.

FIG. 10 is a flowchart illustrating an example of the flow of printing processing. The printing processing is carried out in step S14 in FIG. 9. Referring to FIG. 10, CPU 111 is in a standby mode until data as a processing target is selected, and once the data is selected, the process proceeds to step S22 (step S21). More specifically, CPU 111 displays the BOX print designation screen, shown in FIG. 4, on display portion 114, and waits for designation of data. In step S22, the selected data is read from HDD 116. Here, it is assumed that the data of the file name "document A1" is selected, as shown in BOX print designation screen 201 in FIG. 4.

It is then determined whether printing by adding positional information is designated (step S23). If button 205 in BOX print designation screen 201 is checked, it is determined that the printing by adding the positional information is designated. In that case, the process proceeds to step S24; otherwise, the process proceeds to step S27.

In step S24, the prohibition period is accepted. Specifically, the period input to area 209 in BOX print designation screen 201, "one month" in this case, is accepted. Then, the positional information in HDD 116 where the data selected in step S21 is stored is obtained (step S25).

A composite image is then generated (step S26). Specifically, the positional information obtained in step S25 is superimposed on the image of the target data selected in step S21. Here, the image of characters of the positional information is combined with the image of the target data to generate the composite image.

In step S27, if the process proceeds from step S26, the composite image generated in step S26 is formed on a recording medium such as a sheet of paper. If the process proceeds from step S23, the image of the target data selected in step S21 is formed on the recording medium.

In the following step S28, it is determined whether the target data is stored in a function BOX. If so, the process proceeds to step S29. If the target data is stored in a common BOX rather than the function BOX, the process proceeds to step S30. In step S29, the attribute information associated with the target data is modified. More specifically, the prohibition period accepted in step S24 is set for the prohibition period in the attribute information. On the other hand, in step S30, the user ID of the logged-in user is obtained. Specifically, the user ID temporarily stored in step S01 in FIG. 9 is read. The attribute information is then modified (step S31). Specifically, the user ID obtained in step S30 is set for the user ID in the attribute information, and the prohibition period accepted in step S24 is set for the prohibition period.

Figure 11:
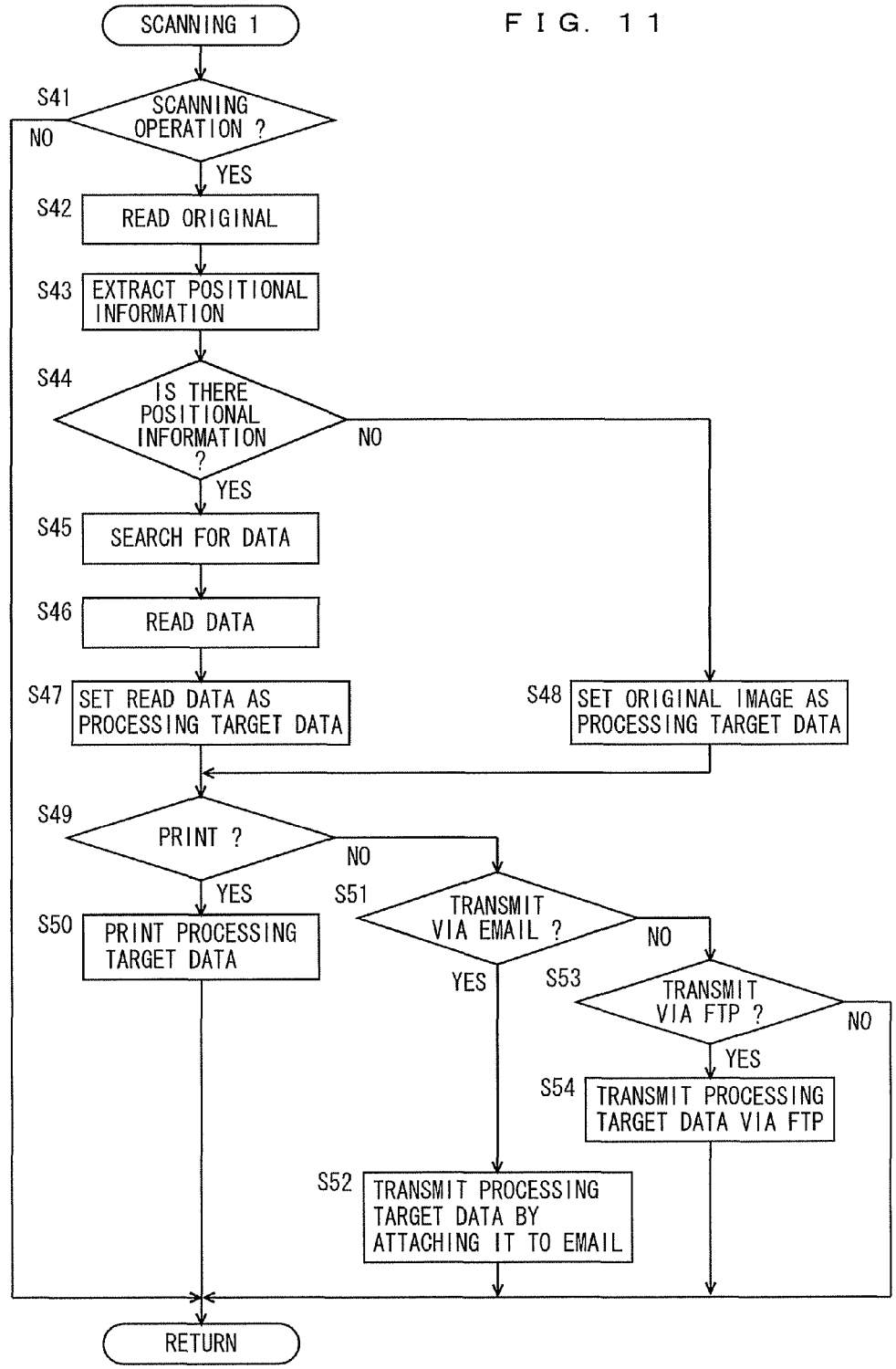
FIG. 11 is a flowchart illustrating an example of the flow of scanning processing.

FIG. 11 is a flowchart illustrating an example of the flow of scanning processing. The scanning processing is executed in step S15 in FIG. 9. Referring to FIG. 11, CPU 111 determines whether the operation accepted in step S03 in FIG. 9 includes a scanning operation (step S41). If so, the process proceeds to step S42; otherwise, the process returns to the data management processing. In step S42, image reading portion 20 is controlled to read an image formed on the original, and the original image output from image reading portion 20 is accepted. In the following step S43, positional information is extracted from the original image. If the positional information is combined as a character image, the character information is extracted through character recognition. If the positional information is superimposed on the original image as the electronic watermark information, the positional information is extracted through image processing. When the positional information is extracted from the original image (YES in step S44), the process proceeds to step S45; otherwise, the process proceeds to step S48. In step S48, the original image is set as the processing target data, and the process proceeds to step S49.

In step S45, HDD 116 is searched for the data stored in the position specified by the positional information extracted from the original image in step S43. The target data extracted as a result of the search is read (step S46), and the process proceeds to step S47. Specifically, in step S46, the data of the file name associated with the positional information is read. In step S47, the read data is set as the processing target data, and the process proceeds to step S49.

In step S49, it is determined whether the operation accepted in step S03 in FIG. 9 includes a printing operation. If so, the process proceeds to step S50; otherwise, the process proceeds to step S51. In step S50, the processing target data is printed. More specifically, the processing target data is output to image forming portion 30 to cause it to form an image of the processing target data on a recording medium.

In step S51, it is determined whether the operation accepted in step S03 in FIG. 9 includes an email transmitting operation. If so, the process proceeds to step S52; otherwise, the process proceeds to step S53. In step S52, an email having the processing target data attached thereto is generated and transmitted.

In step S53, it is determined whether the operation accepted in step S03 in FIG. 9 includes an FTP transmitting operation. If so, the process proceeds to step S54; otherwise, the process returns to the data management processing. In step S54, the processing target data is transmitted via FTP.

Figure 12:
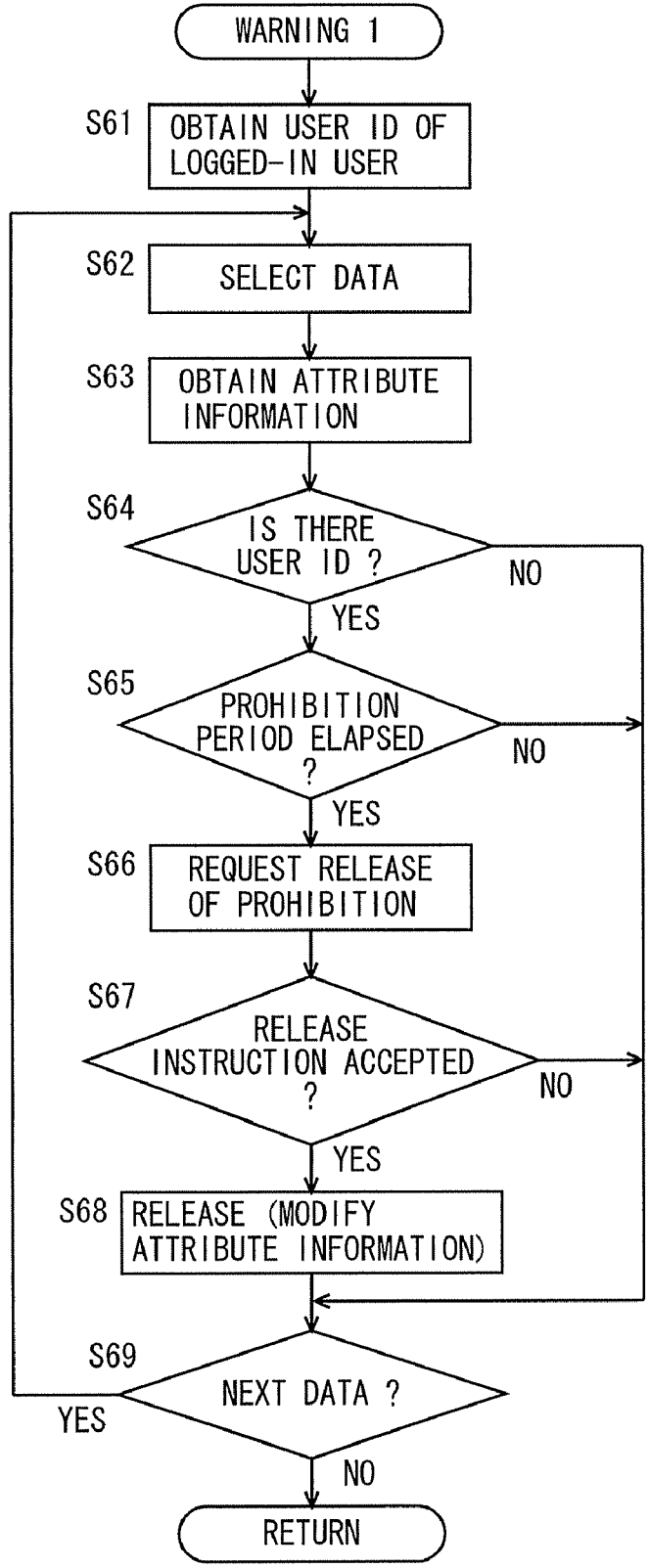
FIG. 12 is a first flowchart illustrating an example of the flow of warning processing.

FIG. 12 is a first flowchart illustrating an example of the flow of the warning processing. The warning processing is carried out in step S02 in FIG. 9. Referring to FIG. 12, the user ID of the logged-in user is obtained (step S61). Specifically, the user ID temporarily stored in step S01 in FIG. 9 is read.

The data is selected (step S62). Specifically, one piece of the data stored in a common BOX in HDD 116 is selected. The attribute information of the selected data is obtained (step S63). Further, it is determined whether the attribute information includes the user ID of the logged-in user (step S64). If the attribute information includes the user ID of the logged-in user, the process proceeds to step S65; otherwise, the process proceeds to step S69.

In step S65, it is determined whether the prohibition period included in the attribute information has elapsed. If so, the process proceeds to step S66; otherwise, the process proceeds to step S69. In step S66, release of the prohibition is requested to the logged-in user. More specifically, the file name of the selected data, and a message to release the prohibition on modification or deletion of the data are displayed on display portion 114.

It is then determined whether a release instruction has been accepted (step S67). Specifically, it is determined whether a button prepared in operation portion 115 for releasing the prohibition on modification or deletion has been depressed by the user. If the release instruction has been accepted, the process proceeds to step S68; otherwise, the process proceeds to step S69. In step S68, the prohibition on modification or deletion is released. More specifically, the prohibition period included in the attribute information obtained in step S63 is erased or set to a blank.

In step S69, it is determined whether unprocessed data is stored in the common BOX in HDD 116. If so, the process goes back to step S62; otherwise, the process returns to the data management processing.

Figure 13:
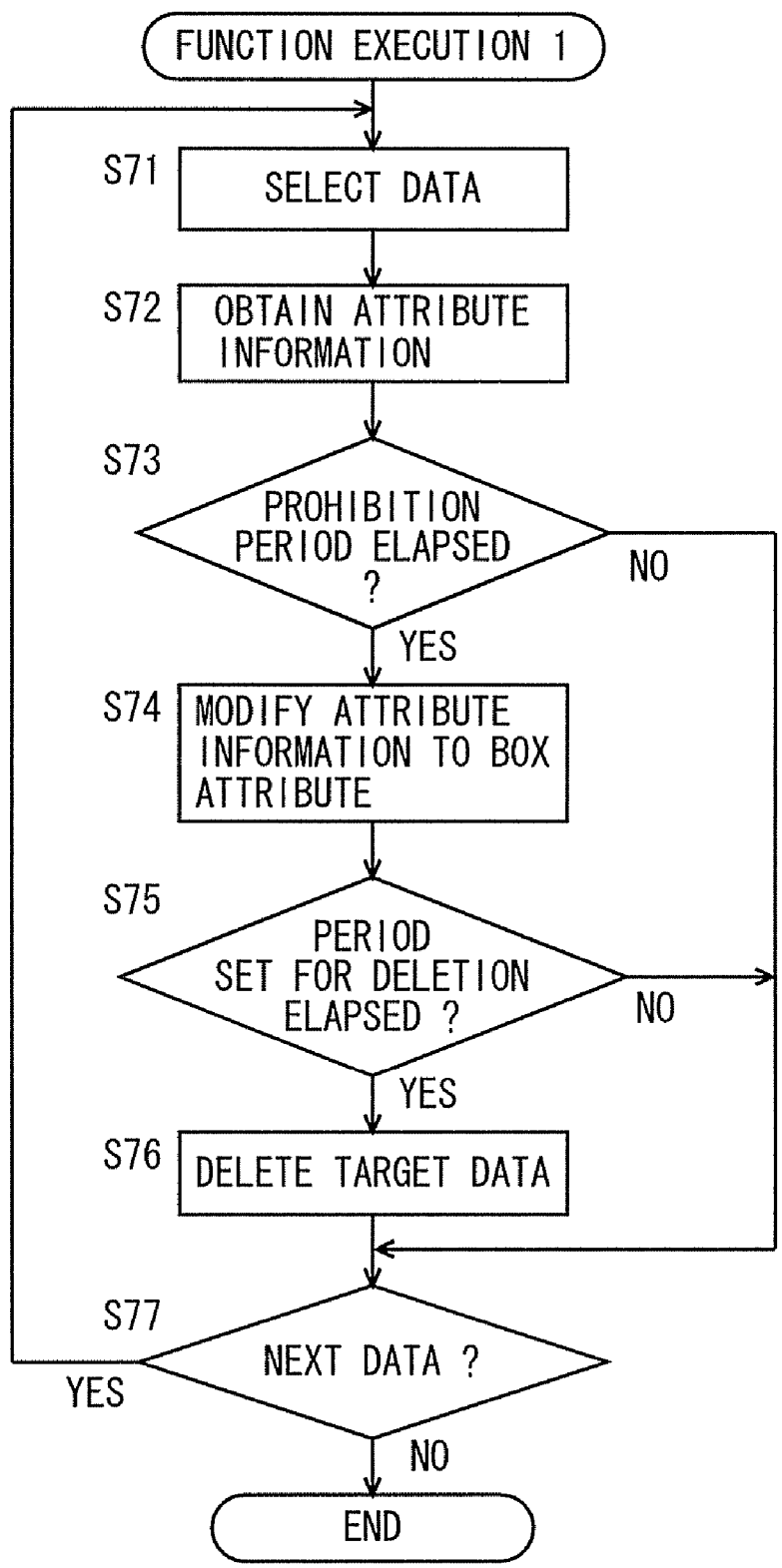
FIG. 13 is a first flowchart illustrating an example of the flow of function execution processing.

FIG. 13 is a first flowchart illustrating an example of the flow of function execution processing. The function execution processing is carried out by CPU 111 as it executes the image forming program. CPU 111 carries out the function execution processing at regular intervals, for example.

Referring to FIG. 13, CPU 111 selects one piece of the data stored in the function BOX in HDD 116 as a processing target (step S71). It then obtains attribute information associated with the processing target data (step S72). It then determines whether the prohibition period included in the attribute information has elapsed (step S73). If so, the process proceeds to step S74; otherwise, the process proceeds to step S77. This is because, if the prohibition period has not yet elapsed, modification or deletion is prohibited, and thus, the processing target data cannot be deleted.

In step S74, the attribute information is modified to the BOX attribute. More specifically, the prohibition period in the attribute information is erased or set to a blank. In the following step S75, it is determined whether a period set for deletion has elapsed. Here, as the processing content associated with the function BOX, the processing of deleting the data stored in the function BOX after a lapse of one week since storage thereof is defined. Thus, it is determined whether one week has passed from the saved date and time included in the attribute information. If the period set for deletion has elapsed, the process proceeds to step S76; otherwise, the process proceeds to step S77.

In step S76, the target data selected in step S71 is deleted from the function BOX. This prevents the undesirable event that unnecessary data is stored consistently in the function BOX, and accordingly, it is possible to effectively use the storage capacity of HDD 116. Further, even if the period set for deletion has elapsed, if the prohibition period has not elapsed yet, the processing proceeds from step S73 to step S77, skipping step S76, so that the data is not deleted. Therefore, at the next-time scanning processing, the processing can be carried out based on the data stored in the function BOX.

In the following step S77, it is determined whether unprocessed data remains in the function BOX. If so, the process returns to step S71; otherwise, the process is terminated.

As described above, according to MFP 100 of the first embodiment, when target data as an output target is designated from among the data stored in HDD 116, a composite image having the image of the target data combined with the positional information indicating the position in HDD 116 where the relevant data is stored is formed on a sheet of paper, and at the same time, modification or deletion of the target data is prohibited. Since modification or deletion of the target data is prohibited after formation of the image on the recording medium, it is possible to ensure consistency between the target data and the image formed on the sheet of paper.

Further, in the case where the original image read by image reading portion 20 includes the positional information, the target data stored in the position specified by the positional information is read from HDD 116, and the target data is subjected to processing. Thus, even if the original includes a handwritten postscript, it is possible to form an image free of the handwritten characters.

Furthermore, when the period of prohibiting modification or deletion of the target data is accepted, modification or deletion of the target data is prohibited until the relevant period elapses. After the lapse of the prohibition period, the target data can be deleted, and accordingly, it is possible to effectively use the storage resources by avoiding the undesirable event that the target data is stored consistently in HDD 116.

Still further, HDD 116 has a function BOX that is set with a processing condition that data stored therein is deleted after a lapse of a predetermined period, one week in this example, since storage of the data. However, if the data is associated with the period for prohibiting modification or deletion of the data, the data is not deleted during the period prohibiting modification or deletion, even after a lapse of one week since storage thereof. This ensures consistency between the image of the data and the image formed on a sheet of paper within a predetermined period.

Further, the data stored in the common BOX includes the user ID in the related information. Thus, at the time point of log in of the user having the user ID associated with the target data, it is possible to inform the user of the fact that modification or deletion of the target data is prohibited beyond the prohibition period. This allows the user to release the prohibition on modification or deletion of the target data, and further delete the target data. As such, it is possible to prevent the target data from being consistently stored in HDD 116.

Second Embodiment

Hereinafter, an MFP 100A according to a second embodiment of the present invention will be described. The hardware configuration of MFP 100A of the second embodiment is identical to that of MFP 100 of the first embodiment, and thus, description thereof will not be repeated here.

Figure 14:
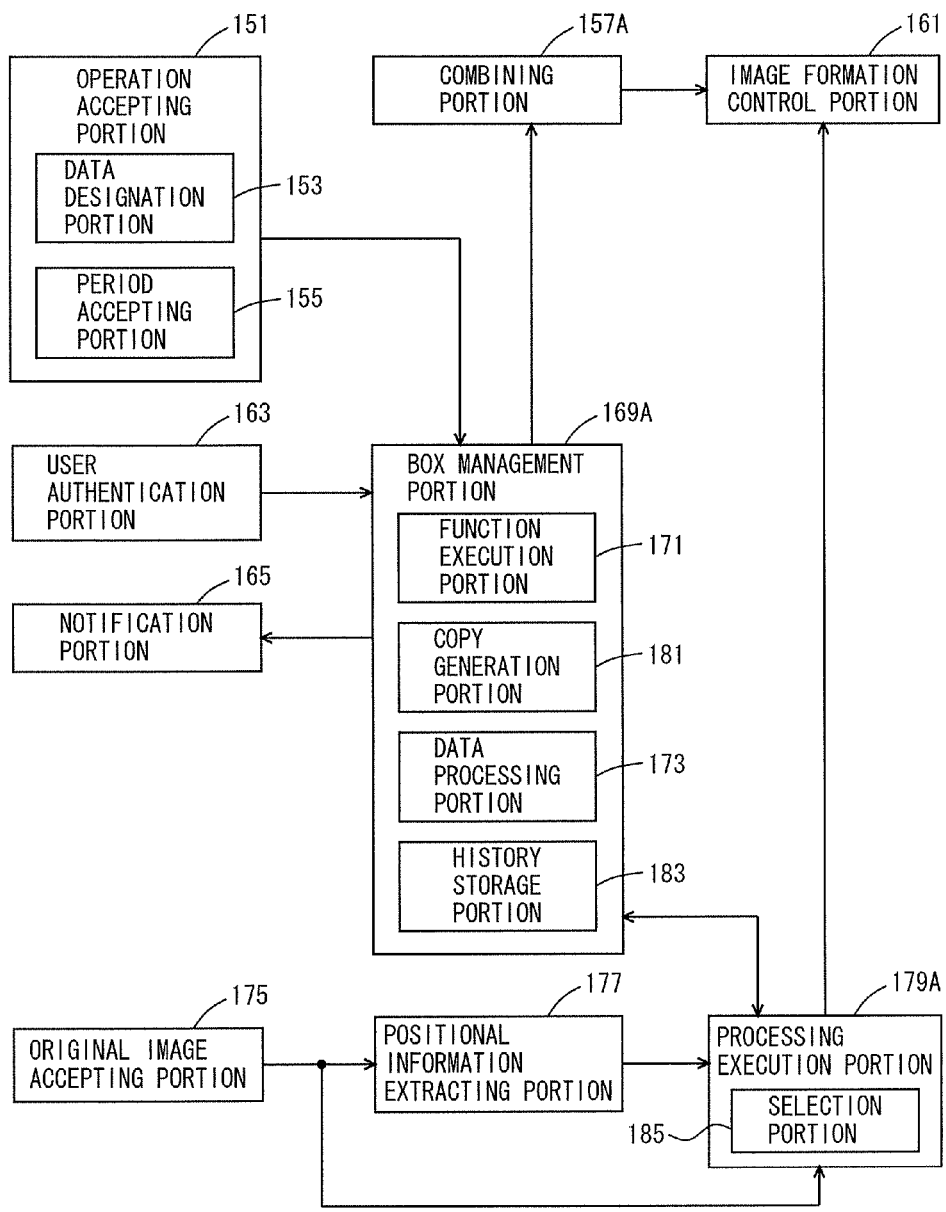
FIG. 14 is a functional block diagram showing an overview of the function of a CPU provided in an MFP according to a second embodiment of the present invention.

FIG. 14 is a functional block diagram showing an overview of the function of a CPU 111A provided in MFP 100A of the second embodiment. The functional block diagram in FIG. 14 differs from that shown in FIG. 3 in that prohibition portion 159 is not provided, and the combining portion 157A, the BOX management portion 169A and the processing execution portion 179A have been modified. The remaining configuration is identical to that in FIG. 3, and thus, in the following, the different points will mainly be described.

When data designation portion 153 included in operation accepting portion 151 accepts designation of target data from among the data stored in HDD 116 that is to be subjected to BOX print processing, it regards the designated data as the target data, and outputs the file name of the target data to BOX management portion 169A. When period accepting portion 155 accepts a period for prohibiting modification or deletion of the target data, it outputs the accepted period to BOX management portion 169A.

BOX management portion 169A includes a copy generation portion 181 and a history storage portion 183, in addition to function execution portion 171 and data processing portion 173. Copy generation portion 181 receives the file name of the target data input from data designation portion 153. Copy generation portion 181 duplicates the target data of the file name input from data designation portion 153, and stores the duplicated data in a prescribed storage area in HDD 116, and outputs the file name of the duplicated data to combining portion 157A. Here, the target data as a source of duplication is called "original data", and the duplicated data is called "copy data". Here, it is assumed that the copy data is stored in an original saving BOX as one of the storage areas provided in HDD 116. Copy generation portion 181 generates related information for associating the original data with the copy data, and stores the same in HDD 116.

Combining portion 157A receives the file name of the copy data input from BOX management portion 169A. Combining portion 157A reads the copy data specified by the file name from HDD 116, and generates an image of the copy data, and also generates a composite image by combining the image of the copy data with the positional information indicating the position in HDD 116 where the copy data is stored. Combining portion 157A outputs the generated composite image to image formation control portion 161. Image formation control portion 161 causes image forming portion 30 to form the composite image on a recording medium such as a sheet of paper. While the case of generating the composite image from the copy data is explained here, it may also be possible to generate the composite image from the original data. In such a case, combining portion 157A generates a composite image by combining the image of the original data with the positional information of the copy data corresponding to the original data.

Figures 15, 16, 17:
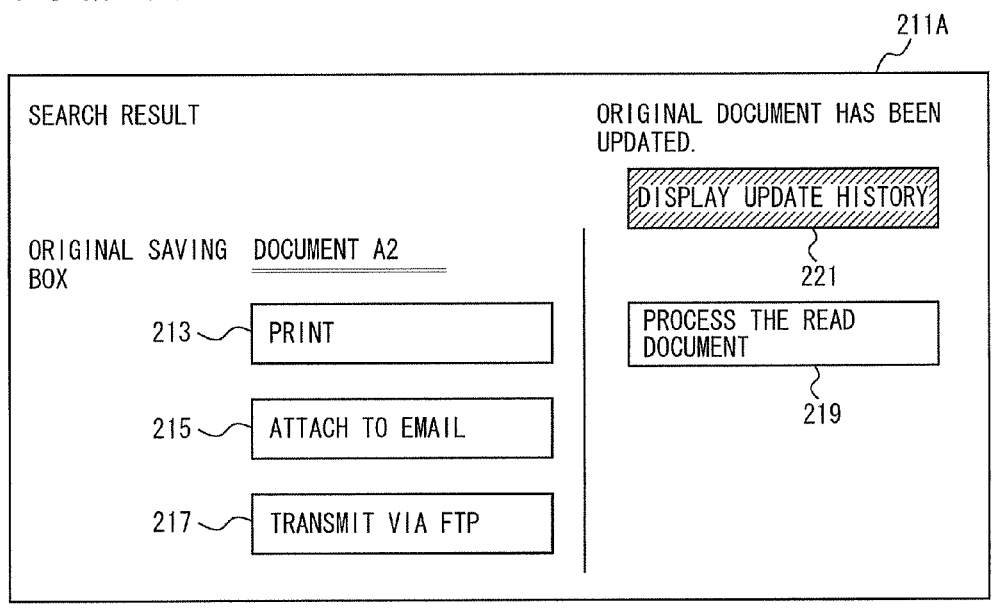
FIG. 15 is a third diagram showing an example of the related information.
FIG. 16 is a fourth diagram showing another example of the related information.
FIG. 17 is a second diagram showing an example of the operation screen.

FIG. 15 is a third diagram showing an example of the related information. Shown in FIG. 15 is the related information in the case where the original data is stored in a common BOX. Referring to FIG. 15, the related information associates an original name indicating the file name of the original data and a copy name indicating the file name of the copy data with attribute information. The attribute information includes a modification history, a prohibition period, and a user ID.

Returning to FIG. 14, in the case where the original data is stored in the common BOX, copy generation portion 181 sets the file name of the original data as the original name in the related information, sets the file name of the copy data as the copy name in the related information, sets the period accepted from period accepting portion 155 as the prohibition period in the attribute information, and sets the user ID authenticated by user authentication portion 163 as the user ID in the attribute information. That is, the user ID of the user who input the BOX print instruction and the prohibition period designated by the user are set as the attribute information in the related information at the time point of input of the BOX print instruction, and the related information is associated with the target data (original data).

FIG. 16 is a fourth diagram showing an example of the related information. Shown in FIG. 16 is the related information in the case where the original data is stored in the function BOX. Referring to FIG. 16, the related information associates an original name indicating the file name of the original data and a copy name indicating the file name of the copy data with attribute information. The attribute information includes a modification history, a saved date and time, and a prohibition period.

Returning to FIG. 14, in the case where the original data is stored in the function BOX, copy generation portion 181 sets the file name of the original data as the original name in the related information, sets the file name of the copy data as the copy name in the related information, sets the period accepted from period accepting portion 155 as the prohibition period in the attribute information, and sets the date and time when the original data was stored in the function BOX as the saved date and time in the attribute information. That is, at the time point of input of the BOX print instruction from the user, the related information is generated, and is associated with the target data (original data).

When the original data is modified or deleted by data processing portion 173, history storage portion 183 stores the history of the processing as history information in association with the original data. The history information includes a history of all the processing performed on the original data after the copy data of the original data was generated. More specifically, the history information including the date and content of the processing as well as the user ID of the user who instructed the processing is stored, and a pointer to the history information is set in the modification history of the attribute information included in the related information having the file name of the original data.

Therefore, in MFP 100A of the second embodiment, the copy data is stored in the original saving BOX, and is not modified thereafter. In contrast, the original data is modified or deleted by data processing portion 173 or function execution portion 171. Further, when the original data is modified or deleted, history storage portion 183 stores the processing of such modification or deletion as the history information, and a pointer to the history information is stored as a part of the related information. This enables confirmation of the difference between the original data and the copy data based on the history information.

When data is stored in a function BOX, function execution portion 171 deletes the data from the function BOX after a lapse of one week from storage thereof. Function execution portion 171 deletes the data even if the related information associated with the data stored in the function BOX includes a prohibition period for prohibiting modification or deletion of the data. Further, when accepting an operation to delete the data stored in HDD 116 from operation accepting portion 151, data processing portion 173 deletes the data according to the accepted operation. Even if the attribute information of the target data as a processing target includes the prohibition period, data processing portion 173 deletes the data. In these cases, history storage portion 183 stores the history information indicating deletion of the data, while the related information associated with the deleted data is not deleted.

Processing execution portion 179A receives the original image input from original image accepting portion 175 and the positional information input from positional information extracting portion 177. Processing execution portion 179A reads the related information including the file name of the copy data stored in the position specified by the positional information, and specifies the original data. It then processes either the original image or the original data.

Processing execution portion 179A includes a selection portion 185. Selection portion 185 displays an operation screen on display portion 114, and determines which to process, the original image or the original data, based on the instruction input from the user. In the case of processing the original data, processing execution portion 179A reads the original data corresponding to the copy data, and processes the read original data. The content of the processing is determined by the instruction input to operation portion 115 by the user according to the operation screen.

Further, selection portion 185 reads the history information indicated by the pointer of the modification history included in the related information, and displays an update history display screen including the history information on display portion 114. This allows the user to confirm the difference between the original image and the original data, and easily determine which one to select.

FIG. 17 is a second diagram showing an example of the operation screen. Referring to FIG. 17, the operation screen includes an area displaying the file name "document A2" of the original data corresponding to the copy data included in the positional information, and also includes buttons 213, 215 and 217 for selecting the processing content, a button 219 for selecting the original image, and a transition button 221 for switching the screen to the one displaying the history information. When button 219 is designated, the original image is selected as the processing target; otherwise, the copy data is selected as the processing target.

When button 213 is selected, print for forming the image of the data is selected as the processing content. When button 215 is selected, email transmission for transmitting the data via email is selected as the processing content. When button 217 is selected, FTP transmission for transmitting the data via FTP is selected as the processing content.

Figure 18:
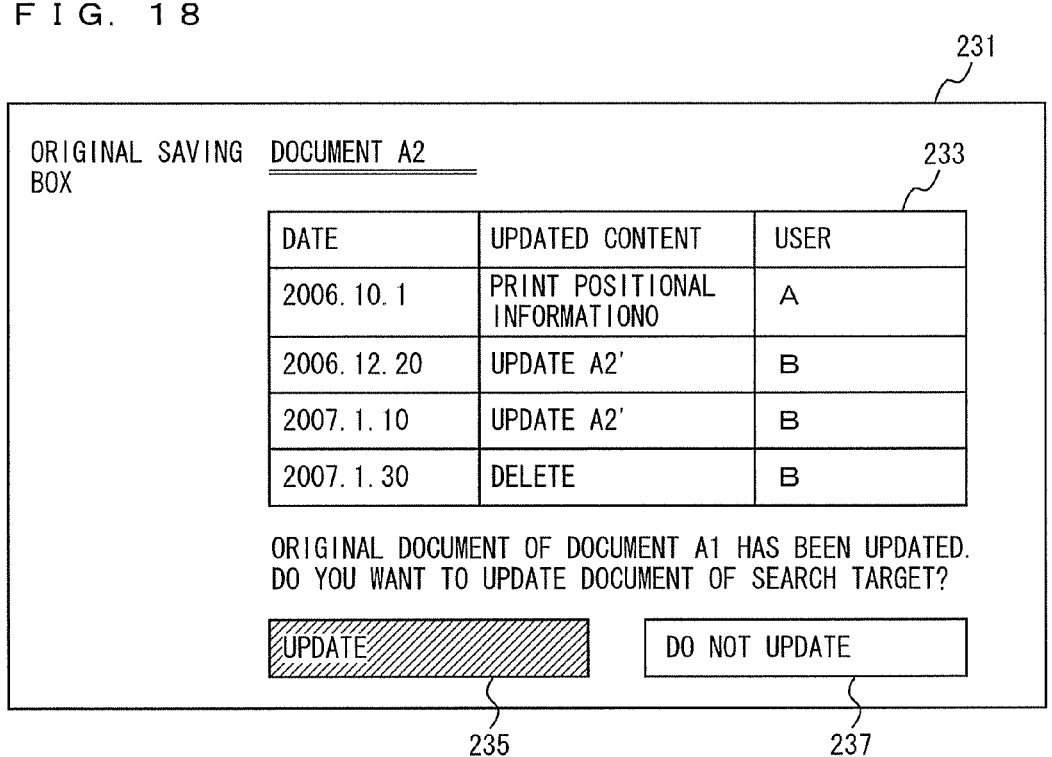
FIG. 18 is a diagram showing an example of an update history display screen.

When transition button 221 is selected, the update history display screen is displayed on display portion 114. FIG. 18 shows an example of the update history display screen. Referring to FIG. 18, the update history display screen includes an area for displaying the file name "document A2" of the original data, an area 233 for displaying the history information, a button 235 having the characters "UPDATE" written thereon, and a button 237 having the characters "DO NOT UPDATE" written thereon. When button 235 is designated, the original data is selected as the processing target, whereas when button 237 is designated, the copy data is selected as the processing target.

Figure 19:
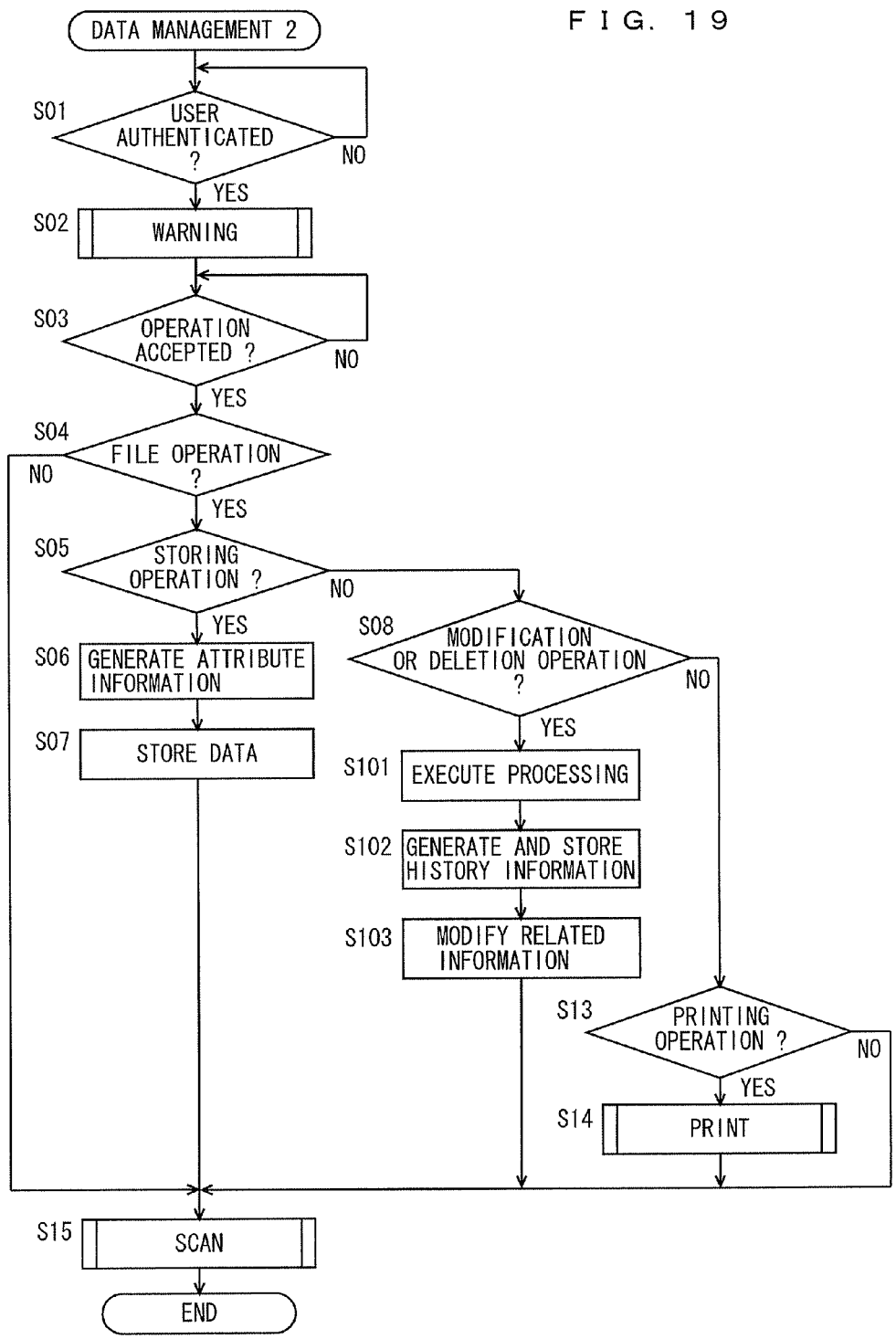
FIG. 19 is a second flowchart illustrating an example of the flow of the data management processing.

FIG. 19 is a second flowchart illustrating an example of the flow of the data management processing. The second flowchart differs from the first flowchart of the data management processing shown in FIG. 9 in that steps S101-S103 are carried out instead of steps S09-S12. Referring to FIG. 19, in step S08, it is determined whether the file operation corresponds to an operation of modifying or deleting the data stored in HDD 116. If so, the process proceeds to step S101; otherwise, the process proceeds to step S13. In step S101, the modification processing or deletion processing is carried out on the data as a target of operation. In the following step S102, history information about the processing of modification or deletion is generated and stored in HDD 116. In step S103, a pointer to the history information is set in the modification history included in the related information associated with the modified or deleted data.

Figure 20:
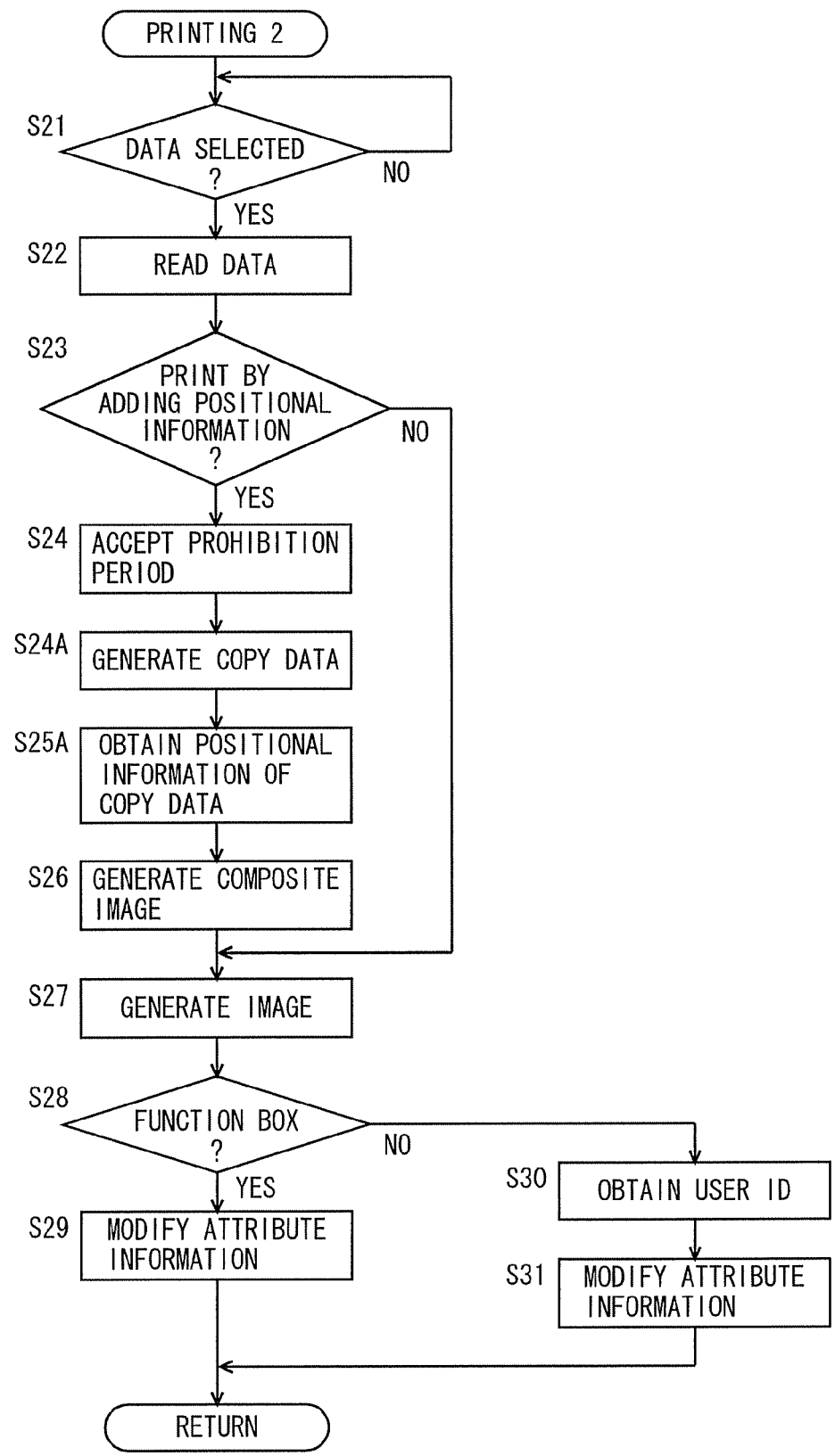
FIG. 20 is a second flowchart illustrating an example of the flow of the printing processing.

FIG. 20 is a second flowchart illustrating an example of the flow of the printing processing. The second flowchart differs from the first flowchart of the printing processing shown in FIG. 10 in that steps S24A and S25A are carried out instead of step S25. Otherwise, the processing is identical, so that description thereof will not be repeated here. Referring to FIG. 20, in step S24A, copy data of the target data selected in step S21 is generated and stored in an original saving BOX. Further, in the following step S25A, the positional information of the copy data in HDD 116 is obtained, and the process proceeds to step S26. In the following step S26, a composite image is generated by combining the image of the target data selected in step S21 with the positional information of the copy data.

Figure 21:
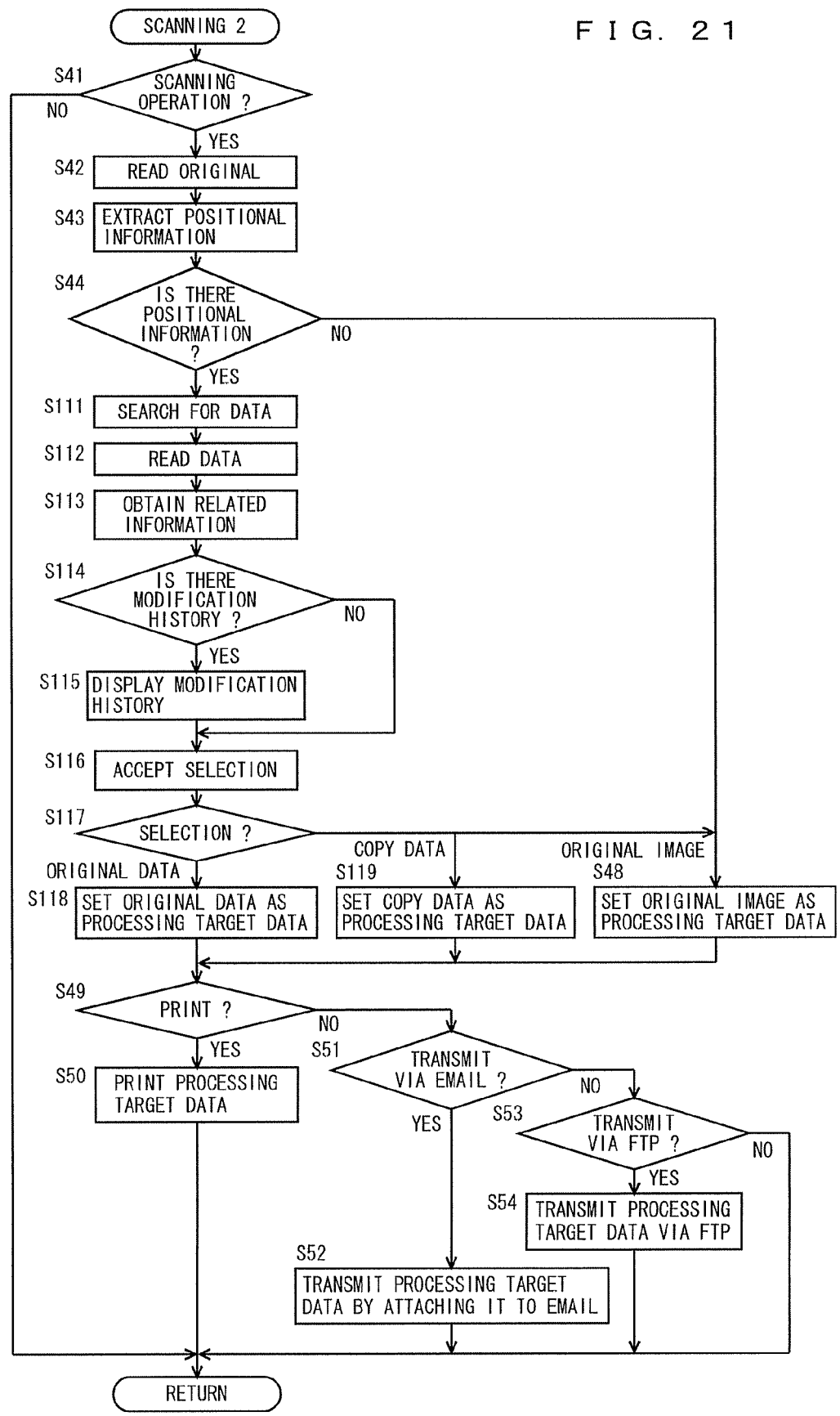
FIG. 21 is a second flowchart illustrating an example of the flow of the scanning processing.

FIG. 21 is a second flowchart illustrating an example of the flow of the scanning processing. It differs from the first flowchart of the scanning processing shown in FIG. 11 in that steps S111-S119 are carried out instead of steps S45-S47. Hereinafter, the points different from the flowchart in FIG. 11 will mainly be described.

In step S111, HDD 116 is searched for the data specified by the positional information extracted from the original image in step S43, the copy data in this case. The copy data extracted as a result of the search is read (step S112), and the process proceeds to step S113. At this stage, operation screen 211A shown in FIG. 17 is displayed on display portion 114.

In step S113, the related information including the file name of the copy data is read. It is then determined whether display of the modification history has been instructed (step S114). Specifically, it is determined whether button 221 on operation screen 211A has been designated. If so, the process proceeds to step S115; otherwise, the process proceeds to step S116, skipping step S115. In step S115, the history information is displayed on display portion 114. Specifically, the update history display screen shown in FIG. 18 is displayed on display portion 114. Then, selection by the user is accepted (step S116). Specifically, it is determined which button was designated, button 219 on the operation screen shown in FIG. 17, button 235 or button 237 on the update history display screen shown in FIG. 18.

In the following step S117, selection by the user is checked, and the process is branched accordingly. More specifically, the process proceeds to step S118 when button 235 on the update history display screen shown in FIG. 18 is designated, proceeds to step S119 when button 237 on the update history display screen shown in FIG. 18 is designated, and proceeds to step S48 when button 219 on the operation screen shown in FIG. 17 is designated.

The user can determine the difference between the original data on one hand and the copy data and the original image on the other hand, based on the history information displayed on the update history display screen, and accordingly, he/she can select either one of them as the processing target.

FIG. 22 is a second flowchart illustrating an example of the flow of the warning processing. It differs from the first flowchart of the warning processing shown in FIG. 12 in that step S68A has been modified. Referring to FIG. 22, in step S68A, the copy data corresponding to the original data selected in step S62, the history information of the original data, and the related information associated with the original data are deleted. Since the prohibition on modification or deletion of the copy data is released, it is no longer necessary to store the copy data, history information and related information. There is a case where the original data has been deleted, in which case step S61 is skipped, and in step S63, the related information of the deleted original data is obtained.

Figure 23:
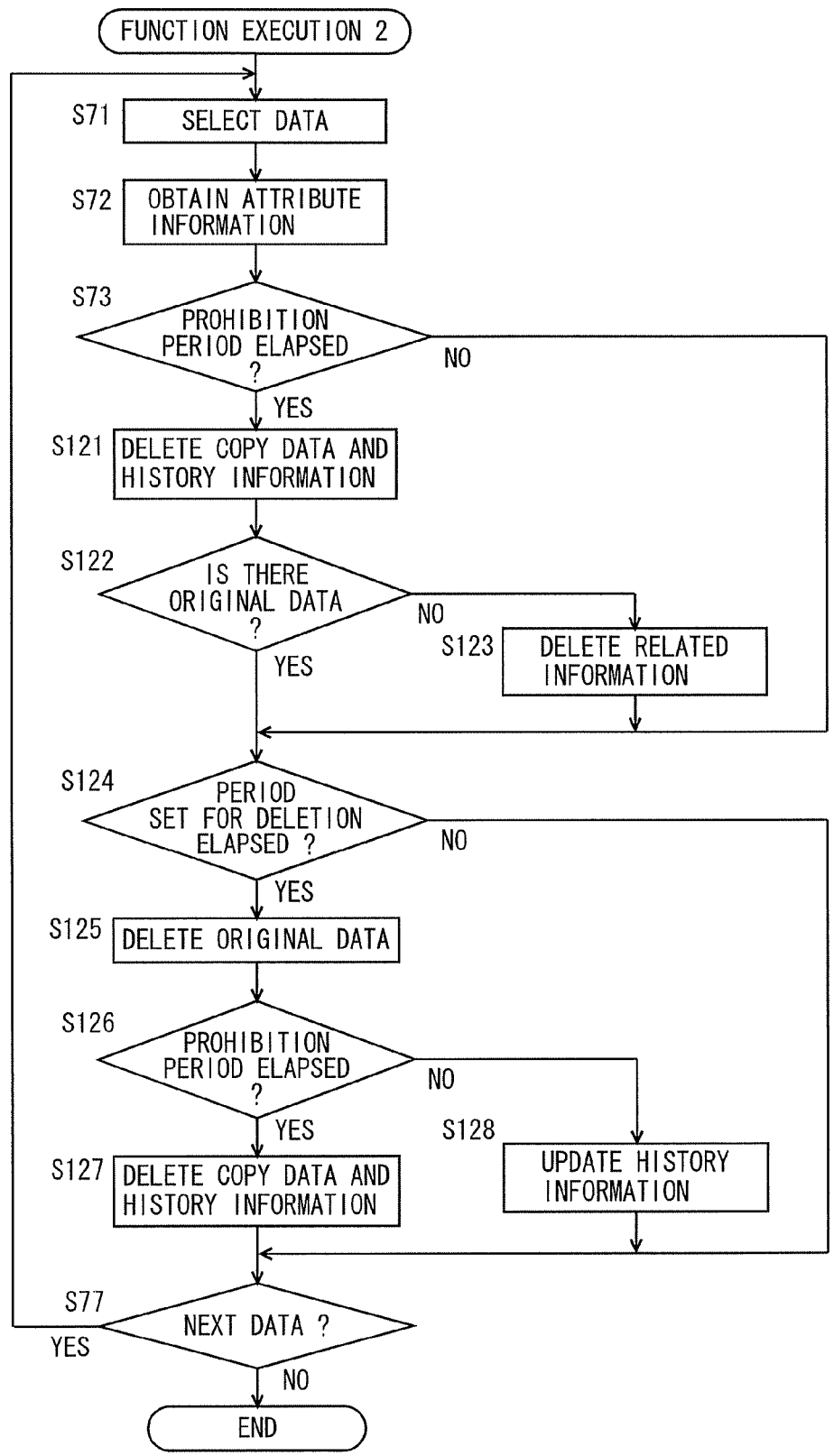
FIG. 23 is a second flowchart illustrating an example of the flow of the function execution processing.

FIG. 23 is a second flowchart illustrating an example of the flow of the function execution processing. Referring to FIG. 23, CPU 111 selects one piece of the data stored in the function BOX in HDD 116 as a processing target (step S71). Then, it obtains attribute information associated with the data of the processing target (step S72). It then determines whether the prohibition period included in the attribute information has elapsed (step S73). If the prohibition period has elapsed, the process proceeds to step S121; otherwise, the process proceeds to step S124, since it is necessary to maintain the copy data if the prohibition period has not elapsed yet.

In step S121, the copy data and the history information are deleted, since it is unnecessary to maintain the copy data and the history information when the prohibition period has elapsed. The related information including the attribute information is not deleted, in order to maintain the saved date and time.

In the following step S122, it is determined whether the original data exists. If so, the process proceeds to step S124; otherwise, the process proceeds to step S123. In step S123, the related information is deleted, and the process proceeds to step S124. This is because, if there is no original data or copy data, it is not necessary to maintain the related information associated therewith.

In step S124, it is determined whether the period set for deletion has elapsed. Here, the processing of deleting the data stored in the function BOX after a lapse of one week from storage thereof is defined as the processing content associated with the function BOX. Thus, it is determined whether one week has passed from the saved date and time included in the attribute information. If the period set for deletion has elapsed, the process proceeds to step S125; otherwise, the process proceeds to step S77.

In step S125, the original data selected in step S71 is deleted from the function BOX. This prevents the unnecessary data from being stored consistently in the function BOX, thereby ensuring effective use of the storage capacity of HDD 116. Even if the period set for deletion has elapsed, if the prohibition period has not elapsed yet, the process proceeds from step S73 to step S124, skipping step S121, so that the copy data and the history information are not deleted. Therefore, upon the scanning processing of next time, the processing can be carried out based on the copy data.

In the following step S126, it is determined whether the prohibition period has elapsed. If so, the process proceeds to step S127; otherwise, the process proceeds to step S128. In step S127, the copy data and the history information are deleted, and the process proceeds to step S77. This is because, if the prohibition period has elapsed, it is no longer necessary to store the copy data and the history information.

On the other hand, in step S128, the history information is updated, and the process proceeds to step S77. Even after the original data has been deleted, the copy data and the history information are stored until a lapse of the prohibition period. As such, when the original image is read thereafter, it is possible to notify the user of the event that the original data has been deleted, and carry out the processing based on the copy data.

In the following step S77, it is determined whether unprocessed data is stored in the function BOX. If so, the process returns to step S71; otherwise, the process is terminated.

As described above, according to MFP 100A of the second embodiment, when the original data is designated as an output target from among the stored data, the copy data duplicated from the original data is stored in the original saving BOX, and a composite image combining the copy data with the positional information indicating the position where the copy data is stored is formed on a sheet of paper. Since the copy data is not modified or deleted after formation of the composite image on the sheet of paper, it is possible to maintain consistency between the copy data and the composite image even after the original data is modified or deleted.

Further, when the original image read by image reading portion 20 includes the positional information, either the original data or the copy data stored in the position specified by the positional information is processed. This enables formation of an image free of handwritten characters even if a postscript is handwritten on the original or the like.

Furthermore, when the original data is modified, the history of modification is stored as the history information. Thus, when the original image read by image reading portion 20 includes the positional information, it is possible to display the fact that the original data corresponding to the copy data stored in the position specified by the positional information has been modified. This allows the user to select which one to process, the original data after modification or the copy data before modification.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
a storage portion to store data;
a designation portion to designate target data to be an output target from among the data stored in said storage portion;
a prohibition portion to prohibit modification or deletion of said target data;
a combining portion to generate a composite image by combining said target data with positional information indicating a position in said storage portion where the target data is stored, wherein the target data is prohibited modification or deletion by the prohibition portion; and
an image forming portion to form said composite image on a recording medium.

2. The image forming apparatus according to claim 1, further comprising:
a reading portion to read an original image formed on said recording medium; and
a processing portion, when said read original image includes said positional information, to process said target data stored in the position in said storage portion specified by said positional information.

3. The image forming apparatus according to claim 1, wherein:
said designation portion includes:
a period accepting portion to accept a period, and
a period-associating portion to associate said accepted period with said target data, and
said prohibition portion prohibits modification or deletion of said target data until the period associated with said target data elapses from the time when the modification or deletion of said target data was prohibited.

4. The image forming apparatus according to claim 1, wherein
said storage portion has a storage area having a processing condition for processing data set therefor,
the image forming apparatus further comprises a function execution portion to process the data stored in said storage area according to said processing condition, and
said prohibition portion prohibits modification or deletion of said target data by said function execution portion.

5. The image forming apparatus according to claim 4, wherein said function execution portion processes said target data according to said processing condition after a lapse of the period associated with said target data.

6. The image forming apparatus according to claim 1, further comprising:
an authentication portion to specify an operator;
an operator-associating portion to associate identification information for identifying the operator specified by said authentication portion when said target data is designated, with said target data; and
a release portion to release the prohibition on modification or deletion of said target data by said prohibition portion, on the condition that the operator identified by said identification information associated with said target data is specified by said authentication portion.

7. The image forming apparatus according to claim 6, further comprising a notification portion, when the operator identified by said identification information associated with said target data is specified by said authentication portion after a lapse of the period associated with the target data from the time when modification or deletion of said target data was prohibited, to notify the operator of the fact that modification or deletion of said target data is prohibited.

8. An image forming apparatus comprising:
a storage portion to store data;
a designation portion to designate original data to be an output target from among the data stored in said storage portion;
a data-associating portion to store copy data duplicated from said original data in said storage portion and associate said original data with said copy data;
a combining portion to generate a composite image by combining said copy data with positional information indicating a position in said storage portion where the copy data is stored, wherein the copy data is prohibited modification or deletion by the prohibition portion; and
an image forming portion to form said composite image on a recording medium.

9. The image forming apparatus according to claim 8, further comprising:

a reading portion to read an original image formed on said recording medium; and a processing portion, when said read original image includes said positional information, to process one of said copy data stored in the position in said storage portion specified by said positional information and said original data associated with the copy data, instead of said original image.

10. The image forming apparatus according to claim 9, further comprising:

a modification history storage portion, when said original data is modified, to store history information indicating a history of the modification and associate said original data with said history information; and a display portion, when said history information is associated with said original data associated with said copy data stored in the position in said storage portion specified by said positional information, to provide display to the effect that said original data has been modified.

11. The image forming apparatus according to claim 10, wherein said display portion includes a history display portion to display said history information.

12. The image forming apparatus according to claim 10, wherein said designation portion includes a period accepting portion to accept a period and a period-associating portion to associate said accepted period with said copy data, and the image forming apparatus further comprises a deletion portion to delete said copy data and said history information associated with said original data associated with the copy data after a lapse of said period associated with said copy data.

13. The image forming apparatus according to claim 8, wherein said designation portion includes a period accepting portion to accept a period and a period-associating portion to associate said accepted period with said copy data, and the image forming apparatus further comprises a deletion portion to delete said copy data after a lapse of the period associated with said copy data.

14. The image forming apparatus according to claim 8, further comprising:

an authentication portion to specify an operator;

an operator-associating portion to associate identification information for identifying the operator specified by said authentication portion when said original data is specified, with said copy data; and a deletion portion to delete said copy data on the condition that the operator identified by said identification information associated with said copy data is specified by said authentication portion.

15. The image forming apparatus according to claim 14, further comprising a notification portion, when the operator identified by said identification information associated with said copy data is specified by said authentication portion after a lapse of the period associated with the copy data, to notify the operator of the fact that said copy data is stored.

16. An image forming method comprising the steps of:

storing data;

designating target data to be an output target from among said stored data;

prohibiting modification or deletion of said target data;

generating a composite image by combining said target data with positional information indicating a position where the target data is stored, wherein the target data is prohibited modification or deletion by the prohibition portion; and forming said composite image on a recording medium.

17. An image forming method comprising the steps of:

storing data;

designating original data to be an output target from among said stored data;

storing copy data duplicated from said original data and associating said original data with said copy data;

generating a composite image by combining said copy data with positional information indicating a position where the copy data is stored, wherein the copy data is prohibited modification or deletion by the prohibition portion; and forming said composite image on a recording medium.

18. A nontransitory computer-readable recording medium having recorded thereon an image forming program for causing a computer to execute processing comprising the steps of:

storing data;

designating target data to be an output target from among said stored data;

prohibiting modification or deletion of said target data;

generating a composite image by combining said target data with positional information indicating a position where the target data is stored, wherein the target data is prohibited modification or deletion by the prohibition portion; and forming said composite image on a recording medium.

19. A nontransitory computer-readable recording medium having recorded thereon an image forming program for causing a computer to execute processing comprising the steps of:

storing data;

designating original data to be an output target from among said stored data;

storing copy data duplicated from said original data and associating said original data with said copy data;

generating a composite image by combining said copy data with positional information indicating a position where the copy data is stored, wherein the copy data is prohibited modification or deletion by the prohibition portion; and forming said composite image on a recording medium.

* * * * *